(12) United States Patent
Smola

(10) Patent No.: US 10,667,369 B2
(45) Date of Patent: May 26, 2020

(54) DEVICE, SYSTEM, AND METHOD FOR DETERMINING AN ADDRESS OF A COMPONENT ARRANGED IN A STRUCTURE

(71) Applicant: SIGNIFY HOLDING B.V., Eindhoven (NL)

(72) Inventor: Paul Smola, Bedford, NH (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/489,451

(22) PCT Filed: Mar. 1, 2018

(86) PCT No.: PCT/EP2018/055029
§ 371 (c)(1),
(2) Date: Aug. 28, 2019

(87) PCT Pub. No.: WO2018/162313
PCT Pub. Date: Sep. 13, 2018

(65) Prior Publication Data
US 2020/0077493 A1    Mar. 5, 2020

Related U.S. Application Data

(60) Provisional application No. 62/469,005, filed on Mar. 9, 2017.

(30) Foreign Application Priority Data

Mar. 21, 2017 (EP) ..................................... 17162082

(51) Int. Cl.
*H05B 45/00* (2020.01)
*H05B 47/18* (2020.01)
(Continued)

(52) U.S. Cl.
CPC ............. *H05B 47/18* (2020.01); *H05B 45/00* (2020.01); *H05B 45/10* (2020.01); *H05B 45/20* (2020.01); *H05B 47/16* (2020.01); *H05B 47/23* (2020.01)

(58) Field of Classification Search
CPC ........ H05B 45/00; H05B 45/10; H05B 45/20; H05B 45/30; H05B 47/10; H05B 47/18; H05B 47/16; H05B 47/23; H05B 47/105
See application file for complete search history.

(56) References Cited

U.S. PATENT DOCUMENTS

2004/0160199 A1   8/2004 Morgan et al.
2014/0055030 A1   2/2014 Kuang et al.
(Continued)

FOREIGN PATENT DOCUMENTS

DE    102012210959 A1   1/2014
DE    102015201434 A1   7/2016
(Continued)

*Primary Examiner* — Jimmy T Vu
(74) *Attorney, Agent, or Firm* — Daniel J. Piotrowski

(57) ABSTRACT

A device, system, and method determine addresses of nodes for an arrangement including strings that have nodes and a splitter. The system includes a controller device connected to a first string, the first string also connected to the splitter. The system includes a bus configuration connecting the nodes to one another and to the controller device. The controller device transmits first signals to the nodes of the first string and sequentially receives first responses. The controller device assigns addresses to the nodes of the first string. The controller device generates a second signal that defines a path to a splitter output. The controller device sequentially receives second responses from nodes of a second string on the splitter output and then assigns addresses to the nodes of the second string.

15 Claims, 10 Drawing Sheets

(51) Int. Cl.
*H05B 45/10* (2020.01)
*H05B 45/20* (2020.01)
*H05B 47/16* (2020.01)
*H05B 47/23* (2020.01)

(56) References Cited

U.S. PATENT DOCUMENTS

2015/0319824 A1 11/2015 Yong et al.
2016/0198533 A1* 7/2016 Williams ........... H05B 33/0827
                                                            315/185 R

FOREIGN PATENT DOCUMENTS

| EP | 2645824 A1 | 10/2013 |
| WO | 2009040014 A1 | 4/2009 |
| WO | 2013095133 A1 | 6/2013 |
| WO | 2016001861 A1 | 1/2016 |
| WO | 2016083954 A2 | 6/2016 |

\* cited by examiner

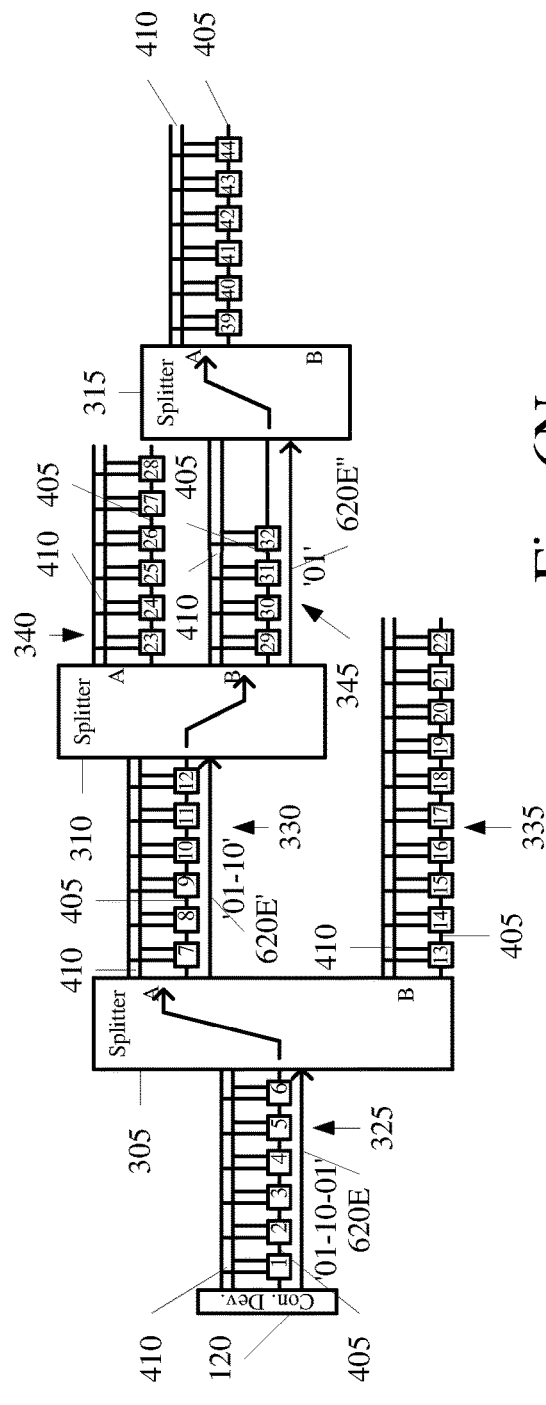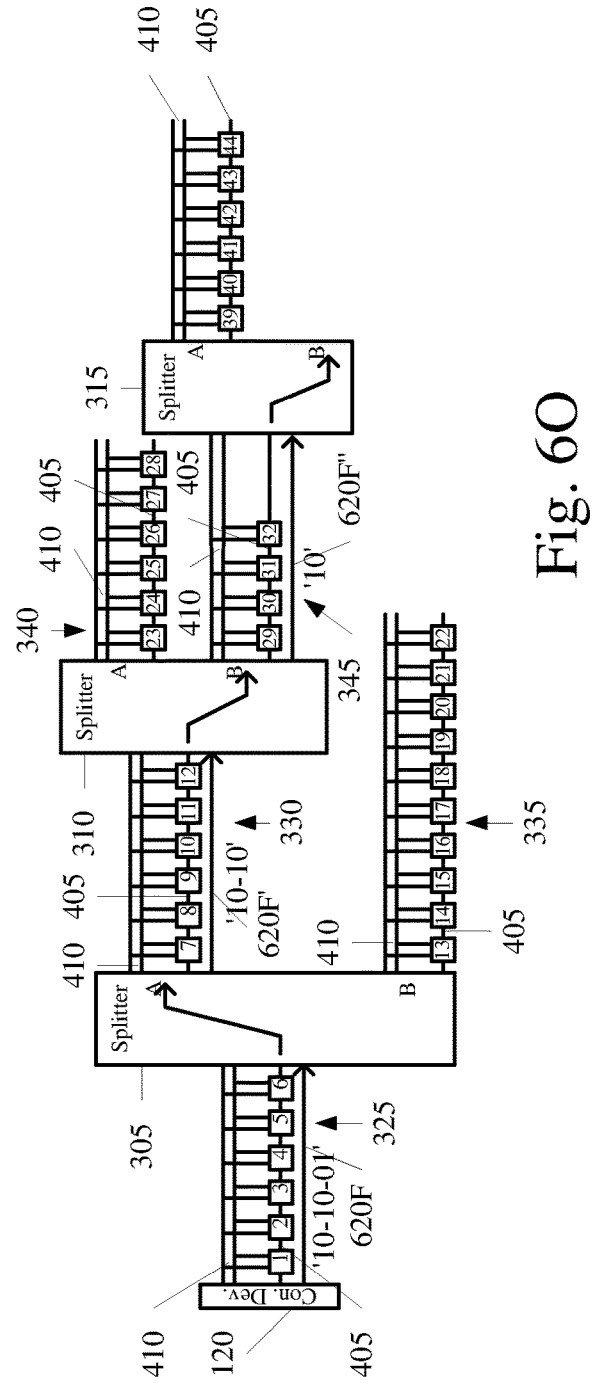

DEVICE, SYSTEM, AND METHOD FOR DETERMINING AN ADDRESS OF A COMPONENT ARRANGED IN A STRUCTURE

CROSS-REFERENCE TO PRIOR APPLICATIONS

This application is the U.S. National Phase application under 35 U.S.C. § 371 of International Application No. PCT/EP2018/055029, filed on Mar. 1, 2018, which claims the benefit of U.S. Patent Application No. 62/469,005, filed on Mar. 9, 2017 and European Patent Application No. 17162082.6, filed on Mar. 21, 2017. These applications are hereby incorporated by reference herein.

BACKGROUND INFORMATION

A lighting arrangement may include one or more lighting arrays arranged in a predetermined manner to create a specific shape or design or a specific display show such as an animation or a plurality of shapes/designs. The lighting arrays may include one or more light strings where each light string includes one or more light nodes. For example, the light nodes may be light emitting diodes (LEDs). Thus, when a current is passed through the light strings, each light of the light string is powered to be illuminated. A lighting arrangement may include any number of light nodes and it is not uncommon for the lighting arrangements to includes tens of thousands, hundreds of thousands, or even millions of lights.

US 20150319824 A1 relates to an apparatus and associated methods relate to an electrical interface design architecture to independently excite each of a network of light strings and/or light string controllers with any of a number of independent excitation signals. In an illustrative example, each of the light strings may receive a selected one of the excitation signals conducted via a wiring assembly to an interface formed as a plug or a corresponding socket.

WO 2013/095133 A1 relates to a method of retrieving status information of a lighting system. The lighting system comprises a plurality of LED-based lighting units arranged as nodes in a linear daisy-chained network, the network having network segments connecting two subsequent nodes downstream of a controller via an upstream transceiver and a downstream transceiver of the network segment, the method comprising: —propagating a command signal from the controller to a node of the lighting system by operating the upstream transceivers of the network segments that are upstream of the node in a transmitting mode and operating each of the downstream transceivers of the network segments that are upstream of the node in a receiving mode; —propagating a reply signal comprising the status information of the LED unit of the node from the node to the controller by operating the upstream transceivers of the network segments that are upstream of the node in a receiving mode and operating each of the downstream transceivers of the network segments upstream of the node in a transmitting mode whereby the method further comprises: —reversing an operating mode of an upstream transceiver of a network segment from operating in a transmitting mode to operating in a receiving mode only when the downstream transceiver of the network segment is operating in transmitting mode.

US 2014/055030 A1 relates to a transit vehicle lighting system has a plurality of LED-based lighting fixtures for providing interior illumination. A control network comprises a plurality of slave nodes for controlling the LED-based lighting fixtures, and a master node for controlling the slave nodes. The master node may be connected to the slave nodes by a combined power/communication bus in a daisy chain fashion. The slave node may include a power regulator and a controller for providing a target current command to the power regulator, and may adjust the target current based upon temperature measurements or a recorded age of the LEDs. An optical sensor may provide automatic dimming. A reduced number of LEDs may be used in an emergency mode. The lighting fixture may include a ceiling panel fixture and a riser panel attachable by way of a hinge mechanism.

WO 2016/083954 A2 relates to a lighting system, comprising a plurality of addressable nodes coupled together to form a network, at least one addressable node of the plurality of addressable nodes coupled to at least one LED light source, and at least one controller coupled to the network and programmed to transmit and receive data to and from the plurality of addressable nodes via a bidirectional data communication channel that forms a bus connection to the plurality of addressable nodes. The controller may be programmed to transmit address information via an addressing line to facilitate addressing of the nodes during commissioning of the nodes. The addressing line forms a serial connection between the plurality of addressable nodes.

However, to properly create the correct shape/design at a particular time, the address of each light node in the entire lighting arrangement (e.g., relative to one another) is required to be known such that a controller device may properly transmit the appropriate signals to illuminate the correct light nodes at the proper intensity and duration. When the address of each light node is not known, the resulting shape/design cannot be created. When the address of at least one light node is incorrect, the resulting shape/design is also not achieved. Thus, there is no margin for error in determining the address of each light node to create a light display.

With the lighting arrangement utilizing any configuration of connections for the lighting arrays (the configuration being more complicated with the more lighting arrays) as well as the lighting arrays utilizing any configuration of connections for the light strings (the configuration being more complicated with more light strings), determining the addresses of each light node in the lighting arrangement is challenging. For example, given the possible number of light nodes, a manual approach of determining the address of each light node is very time consuming and inefficient, particularly with more complex lighting arrangements and display shows. As noted above, even a single node having the incorrect address may cause a complete failure of the lighting arrangement.

More particularly, when the connections between light strings in a lighting array includes a splitter, the determining of the address of each light node can only be performed through the manual approach as there is no current implementation that supports the concept of a splitter (e.g., a first end of a light string connected to a controller, a second end of the light string connected to a splitter, two or more light strings connected to the splitter). In fact, each light string may utilize a splitter where each resulting sub-string may be further broken down into additional sub-strings. The splitting and sub-splitting of strings (to form a tree type structure) is desired to allow the lighting arrangement to comply closely with the physical structure onto which they are installed (e.g., to save installation time and minimizing excess cabling). However, this type of configuration of the lighting arrangement further complicates the manual approach of determining the addresses of each light node and increases the likelihood of resulting in errors.

SUMMARY

The exemplary embodiments are directed to a system for determining addresses of nodes, comprising: an arrangement including: a first string including first nodes of the nodes; a splitter including a plurality of splitter outputs; and a second string connected to a first one of the splitter outputs, the second string including second nodes of the nodes; a controller device connected to a first end of the first string, a second end of the first string connected to the splitter; and a bus configuration configured to connect the nodes to one another and to the controller device, the bus configuration including: a first line for transmitting signals in a first direction; and a second line transmitting signals in a second direction, wherein the controller device transmits a first signal on the first line that is received by the first nodes, wherein the controller device sequentially receives first responses to the first signal on the second line from the first nodes each within a predetermined time period, wherein each of the first nodes utilizes a first node output to transmit the first signal on the first line after transmitting the respective first response, wherein the controller device assigns first addresses to the first nodes based on the sequential receiving of the first responses, wherein the controller device determines a time out of the first signal when no further response is received within the predetermined time period from the first string, wherein the controller device generates a second signal that defines a path to a selected one of the splitter outputs, wherein the controller device transmits the second signal on the first line to be received by the splitter, wherein, when the selected splitter output is the first splitter output, the controller device sequentially receives second responses to the first signal on the second line from the second nodes each within the predetermined time period, and wherein the controller device assigns second addresses to the second nodes based on the sequential receiving of the second responses.

The exemplary embodiments are directed to a controller device for determining addresses of nodes in an arrangement, the arrangement including a first string including first nodes of the nodes, a first end of the first string connected to the controller device, a splitter connected to a second end of the first string including a plurality of splitter outputs, and a second string connected to a first one of the splitter outputs, the second string including second nodes of the nodes, the controller device comprising: an input/output (I/O) arrangement configured to connect the nodes to one another and to the controller device via a bus configuration, the I/O arrangement including: an output connected to a first line for transmitting signals in a first direction on the bus configuration; and an input connected to a second line for receiving signals in a second direction on the bus configuration; a memory storing an executable program; and a processor that executes the executable program that causes the processor to perform operations, comprising: transmitting a first signal on the first line that is received by the first nodes, sequentially receiving first responses to the first signal on the second line from the first nodes each within a predetermined time period, each of the first nodes utilizing a first node output to transmit the first signal on the first line after transmitting the respective first response, assigning first addresses to the first nodes based on the sequential receiving of the first responses, determining a time out of the first signal when no further response is received within the predetermined time period from the first string, generating a second signal that defines a path to a selected one of the splitter outputs, transmitting the second signal on the first line to be received by the splitter, when the selected splitter output is the first splitter output, sequentially receiving second responses to the first signal on the second line from the second nodes each within the predetermined time period, and assigning second addresses to the second nodes based on the sequential receiving of the second responses.

The exemplary embodiments are directed to a lighting array including a plurality of nodes, comprising: a first string including first nodes of the nodes, a first end of the first string connected to a controller device; a splitter including a plurality of splitter outputs, a second end of the first string connected to the splitter; and a second string connected to a first one of the splitter outputs, the second string including second nodes of the nodes, wherein the first nodes, the splitter, and the second nodes are communicatively connected to one another and the controller device via a bus configuration including a first line for transmitting signals in a first direction of the lighting array and a second line for transmitting signals in a second direction of the lighting array, wherein the first nodes receive a first signal from the controller device on the first line, wherein the first nodes sequentially transmit first responses to the first signal on the second line to the controller device each within a predetermined time period, wherein each of the first nodes utilizes a first node output to transmit the first signal on the first line after transmitting the respective first response, wherein each of the first nodes are assigned first addresses by the controller device based on the sequential receiving of the first responses, wherein the splitter receives a second signal on the first line that defines a path to a selected one of the splitter outputs, wherein, when the selected splitter output is the first splitter output, the second nodes receive the first signal on the first line and sequentially transmit second responses to the first signal on the second line to the controller device each within the predetermined time period, and wherein each of the second nodes are assigned second addresses by the controller device based on the sequential receiving of the second responses.

DETAILED DESCRIPTION

Figure 1:
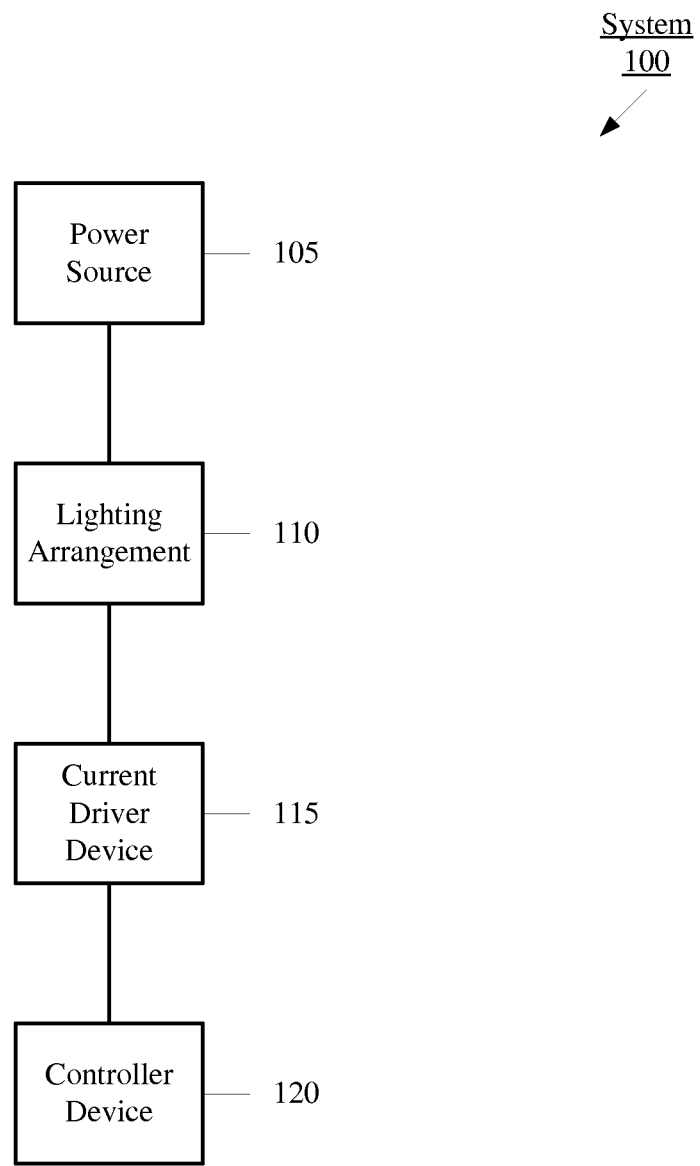
FIG. 1 shows a system according to the exemplary embodiments.

The exemplary embodiments may be further understood with reference to the following description and the related appended drawings, wherein like elements are provided with the same reference numerals. The exemplary embodiments are related to a device, a system, and a method for determining addresses of light nodes relative to one another included in a lighting arrangement. The mechanism according to the exemplary embodiments utilizes a bus configuration in which the light nodes in the lighting arrangement are connected via a bus to a controller device. As will be described in further detail below, the exemplary embodiments provide an automated operation via the bus configuration to determine the addresses of the light nodes relative to other light nodes such that an overall configuration of the light nodes in the lighting arrangement is determined.

Initially, it is noted that the exemplary embodiments are described with regard to light nodes, light strings, lighting arrays, and a lighting arrangement in which an address of the light nodes within the lighting arrangement is determined. However, those skilled in the art will understand that the mechanism according to the exemplary embodiments may be utilized with other arrangements including other components and other sub-components. That is, the mechanism according to the exemplary embodiments may be modified to be used in any system organized as a single string or as a complex tree structure where the spatial/sequential relationship of components or sub-components are to be automatically established.

When attempting to communicate between a set of devices arranged on a common communications bus structure, each device connected to the bus should have an assigned address so that communications are directed to a specific device on the bus. For example, the devices may be light nodes which receive communications to activate the light node, control an intensity of illumination of the light node, deactivate the light node, etc. For flexible systems where devices are added, rearranged, or removed from the system (e.g., a lighting arrangement), the address of a specific device may only be set using a manual approach but it may not be feasible to manually set the address of a specific device due to a high probability of errors occurring. Therefore, a dynamic addressing scheme that is automated provides a mechanism to set the address of specific devices in the system without errors. However, those skilled in the art will understand that any dynamic addressing scheme is complicated, particularly when bus splitters are involved which allows the devices to be arranged in a tree structure.

The exemplary embodiments provide an automated, dynamic location determination for each light node arranged in a lighting arrangement. Specifically, an encoded daisy chained address line that connects to addressable light nodes in series (e.g., a daisy chain) included in a common bus configuration may be used in exchanging signals with a controller device that commissions the light nodes and assigns an address consistent with the timing and manner in which the signals are exchanged. As will be described in detail below, each light node may be commissioned one at a time until all light nodes have been commissioned. The signal exchange and the address line may further be utilized with any splitters in the lighting arrangement based on how the light strings of a lighting array are connected. Once the spatial relationship of an addressable light node is established relative to other light nodes in the lighting arrangement through all the serial connections, the light node may be assigned the address. In this manner, when the lighting arrangement is being initially installed, subsequently redesigned, or repaired, the exemplary embodiments provide an automated, dynamic manner of determining the addresses of each light node in the lighting arrangement such that a desired shape/design or lighting display may be programmed based on the knowledge of the locations of each light node and the addressability of each light node.

FIG. 1 shows a system 100 according to the exemplary embodiments. The system 100 relates to a lighting device that is used to illuminate one or more designs to create a light display. Thus, the system 100 may include a power source 105, a lighting arrangement 110, a current driver device 115, and a controller device 120. The system 100 also relates to determining an address for each light node in the lighting arrangement 110 relative to other light nodes in the lighting arrangement 110. The controller device 120 may be configured for this further functionality.

The power source 105 may be any source of power in which the lighting arrangement 110 may be provided power (e.g., a current). For example, the lighting arrangement 110 may include an adapter that connects to an outlet of the power source 105. Once connected, the power source 105 may provide current to the lighting arrangement 110. Specifically, a steady or static rate of current may be provided from the power source 105 as long as the connection is established. In another example, the power source 105 may be a portable power supply such as a high capacity battery that provides the power to the lighting arrangement 110. The power source 105 may also provide power to any further components that are connected directly or indirectly. As illustrated in the system 100 of FIG. 1, the current driver device 115 and the controller device 120 may be indirectly connected to the power source 105 via the lighting arrangement 110.

It is noted that the system 100 may utilize any other configuration in which the components are connected in various different manners. As will be described in detail below, the controller device 120 may have a direct connection with the current driver device 115 to control how the lighting arrangement 110 operates. The controller device 120 may also have a direct connection to the lighting arrangement 110 to provide the features and functionalities of the exemplary embodiments. However, the system 100 shows an exemplary embodiment where the controller device 120 may exchange data with the lighting arrangement 110 through the current driver device 115.

The lighting arrangement 110 may be any configuration of light nodes that are connected through series connections and/or splitters. Specifically, the lighting arrangement 110 may include one or more lighting arrays where each lighting array includes one or more light strings where each light string includes one or more light nodes arranged in series. Thus, the light nodes may be connected to one another such that current provided on a first end of a light string that is connected to the power source 105 is passed through the entire light string to power each of the light nodes in the light string. Each lighting array in the lighting arrangement 110 may be arranged with a first light string being powered at a first end and one or more light strings connected thereafter (e.g., in series with the first light string or via a splitter) at a second end of the first light string also being powered. Each subsequent light string may be connected in this manner until the entire lighting array is created and powered. The power from the power source 105 may be used to power each light string that is connected in this manner. An exemplary arrangement of connections in a lighting array of the lighting arrangement 110 will be described in further detail below with regard to FIG. 3. The one or more light nodes in the lighting arrangement 110 may be of any type. For example, the light nodes may be filament bulbs, light emitting diodes (LEDs), etc. The light nodes may also be dimmable such that each of the light nodes may be respectively fully illuminated, partially illuminated, or unpowered at any given time.

Figure 3:
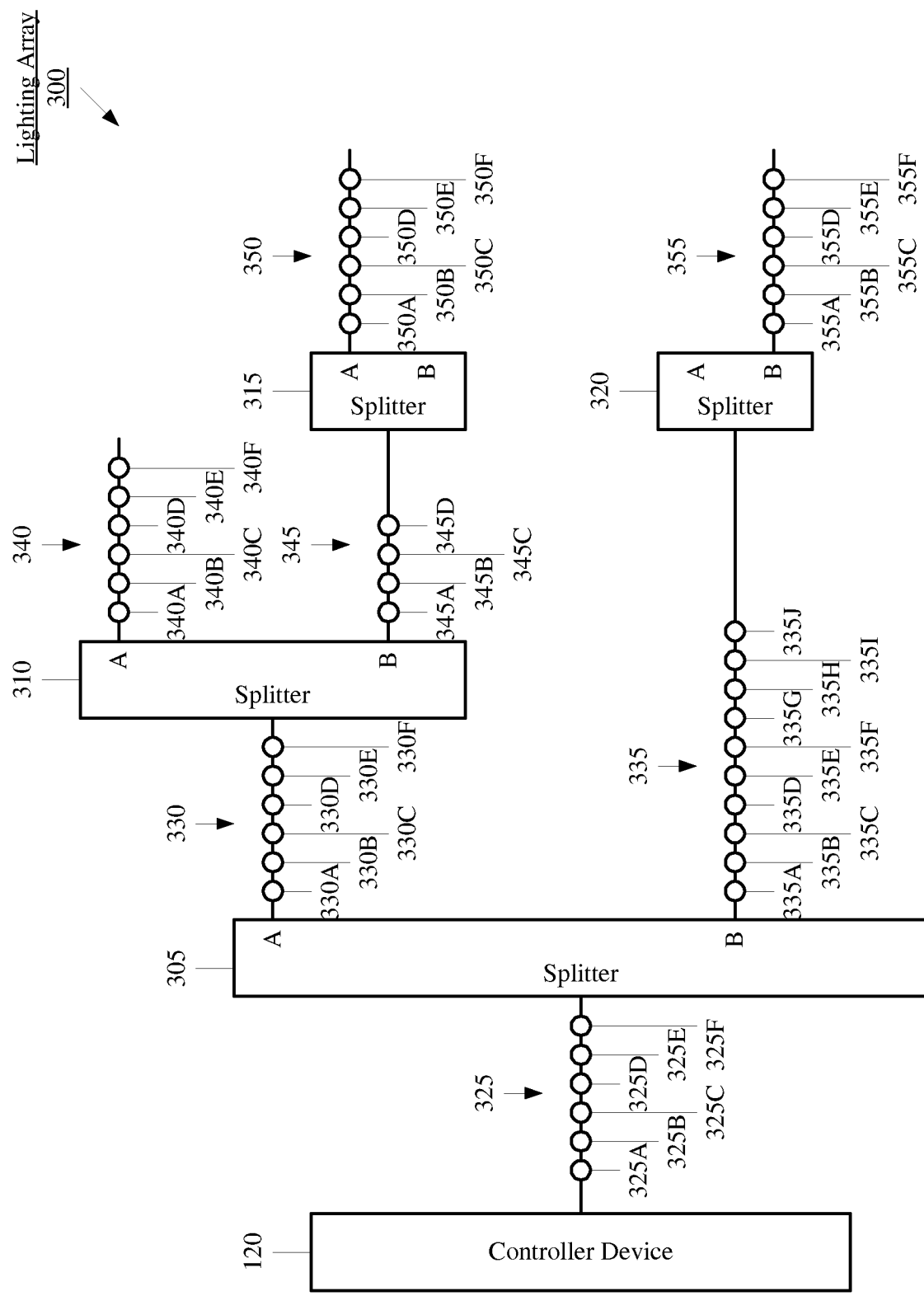
FIG. 3 shows a lighting array of a lighting arrangement of FIG. 1 according to the exemplary embodiments.

FIG. 3 shows a lighting array 300 of the lighting arrangement 105 of FIG. 1 according to the exemplary embodiments. As noted above, the lighting arrangement 110 may include one or more lighting arrays. The lighting array 300 may represent one exemplary array that is included in the lighting arrangement 110. The lighting array 300 may include a plurality of light strings 325-355 and one or more splitters 305-320. The light strings 325-355 may be connected such that each light node of the lighting array will have a series path to the controller device 120. In addition, the splitters 305-320 may be used to create a tree structure. As described above, the controller device 120 may be connected to the lighting array 300. Thus, a data communication path may be established between the controller device 120 and the lighting array 300 to assign the addresses of the light nodes of the lighting array 300 according to the exemplary embodiments. The communication path will be described in further detail below with regard to FIG. 4. Specifically, in using the bus configuration, each light node in the lighting array 300 may be configured with a capability of determining an operation to be performed based on an incoming signal. The splitters 305-320 may also be configured with a capability of determining an operation to be performed based on an incoming signal.

The light string 325 may include a plurality of light nodes 325A-F where the light node 325A is closest to the controller device 120 and the light node 325F is furthest and ends the light string 325. At the end of the light string 325, the splitter 305 may be connected. The splitter 305 may have a single input (the light string 325) and include two outputs—A and B. Specifically, the two outputs may be for the light string 330 and the light string 335.

The light string 330 may include a plurality of light nodes 330A-F where the light node 330A is closest to the splitter 305 and the light node 330F is furthest and ends the light string 330. The light string 335 may include a plurality of light nodes 335A-J where the light node 335A is closest to the splitter 305 and the light node 335J is furthest and ends the light string 335. The light string 335 also illustrates that each light string may include any number of light nodes. At the end of the light string 330, the splitter 310 may be connected. The splitter 310 may also have a single input (the light string 330) and include two outputs—A and B. Specifically, the two outputs may be for the light string 340 and the light string 345. The light string 340 may include a plurality of light nodes 340A-F where the light node 340A is closest to the splitter 310 and the light node 340F is furthest and ends the light string 340. The light string 345 may include a plurality of light nodes 345A-F where the light node 345A is closest to the splitter 310 and the light node 345D is furthest and ends the light string 345. At the end of the light string 335, the splitter 320 may be connected. The splitter 320 may also have a single input (the light string 335) and include two outputs—A and B. Specifically, one of the two outputs may be for the light string 355. The splitter 320 illustrates that all the outputs of a splitter may not be used. The light string 355 may include a plurality of light nodes 355A-F where the light node 355A is closest to the splitter 320 and the light node 355F is furthest and ends the light string 355. At the end of the light string 345, the splitter 315 may be connected. The splitter 315 may also have a single input (the light string 345) and include two outputs—A and B. Again, only a single output may be used. Thus, one of the two outputs may be for the light string 350. The light string 350 may include a plurality of light nodes 350A-F where the light node 350A is closest to the splitter 315 and the light node 350F is furthest and ends the light string 350. As will be described in further detail below, the splitter 305 may represent a first level of the splitters, the splitters 310, 320 may represent a second level of the splitters, and the splitter 315 may represent a third level of the splitters.

It is again noted that the light strings 325-355 are arranged such that each light node has a series path to the controller device 120 and the light nodes in each of the light strings 325-355 are arranged in series. It is also noted that the number of light strings, the number of light nodes in each of the light strings, the number of splitters, the type of splitters, etc. is only exemplary. Those skilled in the art will understand that the light array 300 may include any number of light strings, any number of light nodes in each light string, any number of splitters, any configuration of splitter (e.g., more than two outputs), a light string to light connection without a splitter, etc. For example, a first further splitter having three outputs may be connected to the end of the light string 340 in which first and second further light strings are connected to the first further splitter (leaving one output empty). In another example, a second further splitter having four outputs may be connected to the end of the light string 355 in which a third further light string is connected to the second further splitter (leaving three outputs empty). In a further example, a third further splitter having two outputs may be connected to the end of the light string 350 but has no further light strings connected thereto. As will become apparent below, the splitters may include any number of outputs so long as the controller device 120 has knowledge of the maximum number of outputs of any of the splitters.

Returning to the system 100 of FIG. 1, the current driver device 115 may be configured to control the current passing through the lighting arrangement 110 from the power source 105. Specifically, the current driver device 115 may receive an input indicating the amount of current to be supplied to the lighting arrangement 110, particularly for a lighting array of the lighting arrangement 110 as well as for the light strings and the light nodes in the lighting array. Based on this input, the current driver device 115 may utilize an operation or setting such that the indicated current is provided accordingly. The current driver device 115 may continue to provide the indicated current until a further input is received that indicates a different current that is to be supplied to the lighting arrangement 110. It is noted that the current driver device 115 may be located within the lighting arrangement 115 (e.g., within the light nodes). As is described below, the controller device 120 may direct each addressable light node to draw a specific current using a signal (e.g., a data structure) which is transmitted on a communication pathway (e.g., a common bus structure). Each light node may then draw a specified amount of current until a subsequent signal is transmitted which then sets a new current level for each of the addressable light nodes.

The controller device 120 may be configured to assign the relative addresses of the light nodes in the light strings of the lighting array 300 in the lighting arrangement 110. Specifically, the controller device 120 may utilize a communication path established with a bus configuration to exchange data with the light nodes. Through the data exchange, the controller device 120 may generate an overall map of where the light nodes in the lighting array 300 are located relative to one another.

Figure 2:
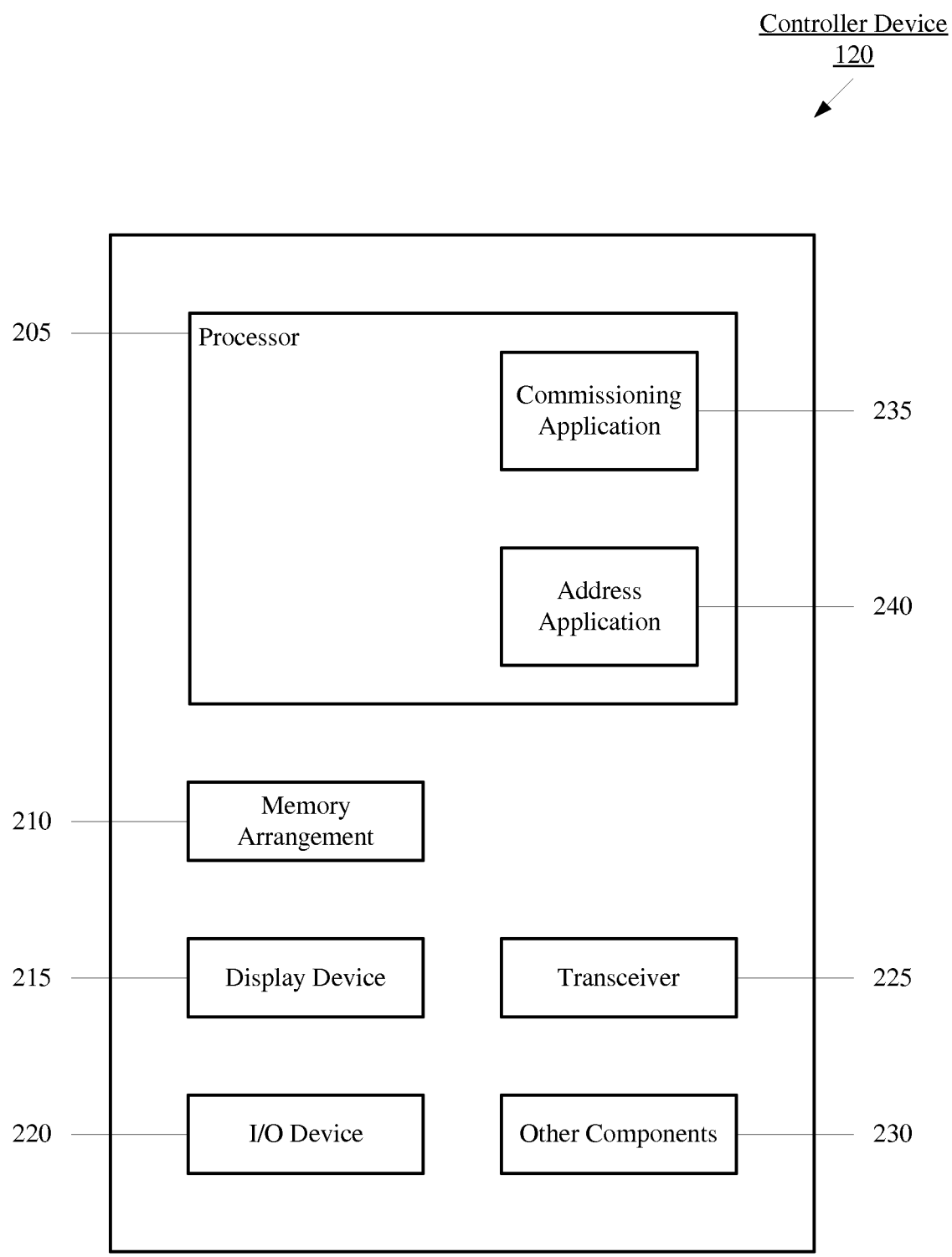
FIG. 2 shows a controller device of FIG. 1 according to the exemplary embodiments.

FIG. 2 shows the controller device 120 of FIG. 1 according to the exemplary embodiments. The controller device 120 may provide various functionalities in determining the addresses of the light nodes in the lighting array 300. The controller device 120 is described as a computing component to which the other components of the system 100 are connected. In one example, the controller device 120 may be a programmable electronic device connected to the current driver device 115. As will be described in detail below, the controller device 120 may exchange data with the light nodes in the lighting array 300 to determine relative positions to other light nodes such that an overall map of the light nodes in the lighting array 300 may be determined. As shown in FIG. 2, the controller device 120 may include a processor 205, a memory arrangement 210, a display device 215, an input and output (I/O) device 220, a transceiver 225, and other components 230.

In another example, the controller device 120 may be embodied as discrete circuitry on a printed circuit board or integrated circuit. In such an arrangement, the controller device 120 may be configured to generate a signal indicating a relative position of the light nodes that is transmitted to a further component such as a computer. The computer may utilize the signals or the output to determine the overall map of the light nodes in the lighting array 300.

The processor 205 may be configured to execute a plurality of applications or perform a plurality of operations. For example, the controller device 120 may provide normal operations associated therewith. Specifically, the controller device 120 may be configured to execute a schedule that includes the timing and the intensity with which the light nodes in the light strings of the lighting arrangement 110 are to be illuminated. Accordingly, the controller device 120 may be the component that provides the input to the current driver device 115 to control how much current is to be provided to the lighting arrangement 110 to achieve the desired intensity. The controller device 120 may also be configured to receive an input of the desired schedule upon which the lighting arrangement 110 is to be illuminated. However, these operations of the controller device 120 may be performed after a commissioning process according to the exemplary embodiments has been completed.

In the exemplary embodiments, the processor 205 may be configured to execute a commissioning application 235 and an address application 240 which are performed during the commissioning process prior to the lighting arrangement 110 being used. The commissioning application 235 may determine how signals are transmitted to the lighting array 300 through the bus configuration. As will be described in detail below, the commissioning application 235 and the light nodes/splitters of the lighting array 300 may be configured with a set of rules to determine the signals to be used and how to select an operation based on an incoming signal. Specifically, the commissioning application 235 may utilize an idle timing mechanism, an address assertion mechanism, and a splitter signaling mechanism to determine the relative addresses of the light nodes. The address application 240 may receive any return signal from the light nodes of the lighting array 300 to assign the relative address of the light nodes relative to other light nodes.

It should be noted that the commissioning application 235 and the address application 240 being an application (e.g., a program) executed by the processor 205 is only exemplary. The functionality associated with the applications may also be represented as components of one or more multifunctional programs, a separate incorporated component of the controller device 120, or may be a modular component coupled to the controller device 120, e.g., an integrated circuit with or without firmware.

The memory 210 may be a hardware component configured to store data related to operations performed by the controller device 120. Specifically, the memory 210 may store the rules, the output from the light nodes, and any resulting mapping information. The display device 215 may be a hardware component configured to show data to a user while the I/O device 220 may be a hardware component that enables the user to enter inputs. For example, the relative addresses of the light nodes or the overall map of the light nodes may be shown to a user. It should be noted that the display device 215 and the I/O device 220 may be separate components or integrated together such as a touchscreen. The transceiver 225 may be a hardware component configured to transmit and/or receive data (e.g., via a communications network). For example, the relative addresses of the overall map may be determined and transmitted to another display device on a remote electronic device to be viewed by a user.

According to the exemplary embodiments, an encoded daisy chained address line may be used that connects to addressable light nodes in series fashion (e.g., a daisy chain) as well as to any splitters in the lighting array 300 to enable automated assignment of addresses for any arrangement of light nodes and splitters. The introduction of one or more splitters in the lighting array 300 causes the light nodes to not be in a simple linear arrangement. The exemplary embodiments utilize the encoded daisy chained address line with the bus configuration for signals to be exchanged between the controller device 120 and the light nodes of the lighting array 300.

The exemplary embodiments may utilize a signaling scheme to commission each light node and assign the address relative to the other light nodes. For example, the light node 325C may be determined relative to all other light nodes 325A, B, D-F, 330A-F, 335A-J, 340A-F, 345A-D, 350A-F, and 355A-F. As described above, the exemplary embodiments may utilize a bus configuration in which a data communication path is established between the controller device 120 and all the light nodes of the array 300.

Figure 4:
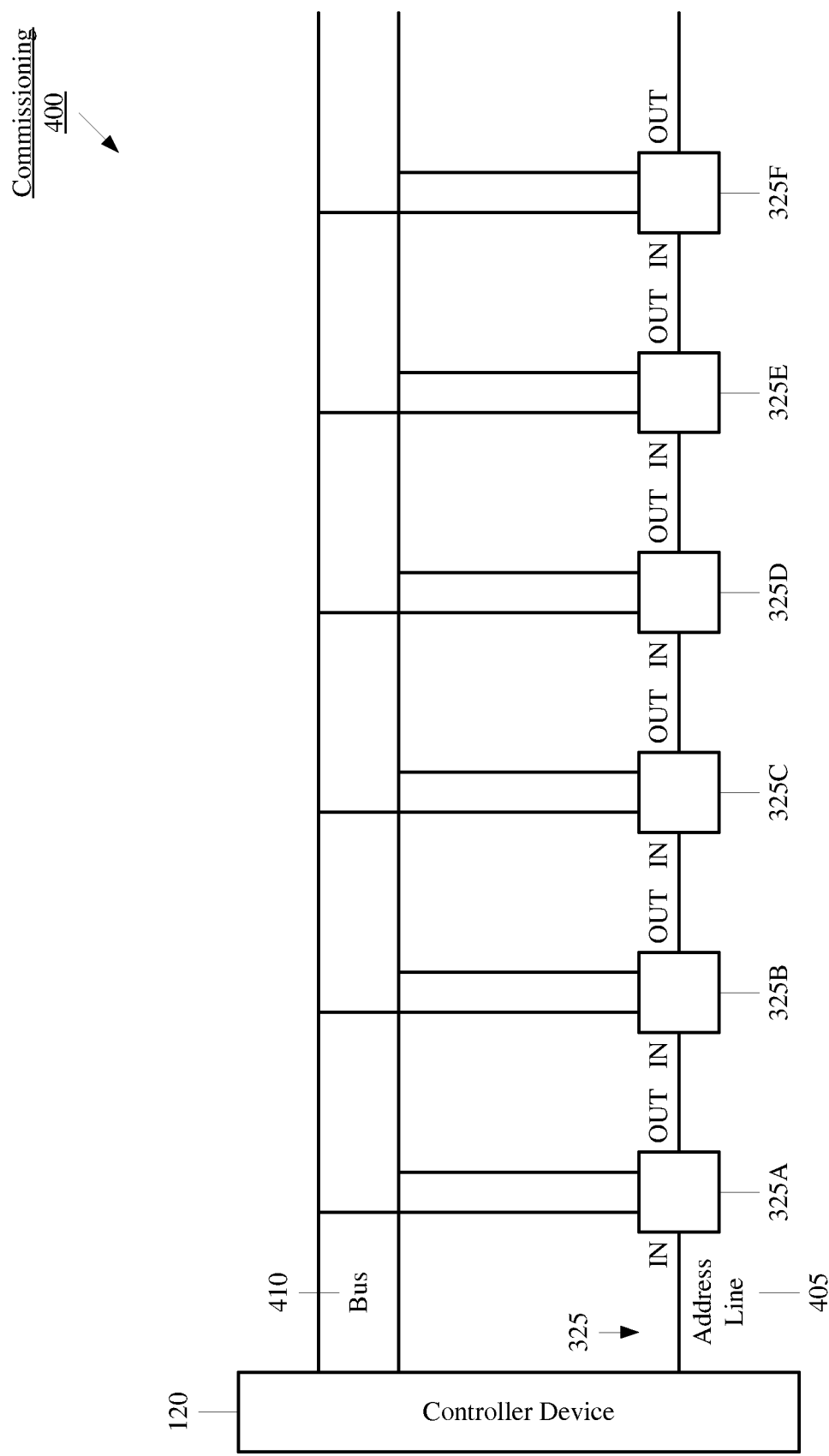
FIG. 4 shows a commissioning configuration of the system of FIG. 1 according to the exemplary embodiments.

FIG. 4 shows a commissioning configuration 400 of the system 100 of FIG. 1 according to the exemplary embodiments. Specifically, the commissioning configuration 400 may represent a data communication path in which a bus configuration is used. The commissioning configuration 400 may be for the light string 325 of the lighting array 300. Thus, the following is directed to a commissioning process to assign addresses to the light nodes in the light string 325 of the lighting array 300. As will be described in further detail below, the commissioning process may continue for the other light strings 330-355 as well as handle the scenario where the splitters 305-320 are included in the lighting array 300. However, the initial description below addresses how the exemplary embodiments assign the addresses of a first light string closest to the controller device 120.

As illustrated in FIG. 4, the light string 315 may be a first light string that is directly connected to the controller device 120. It is again noted that, as shown in the system 100 of FIG. 1, the light string 315 and the lighting arrangement 110 may be connected to the controller device 120 via the current driver device 115. However, for illustrative purposes, the current driver device 115 is not shown. The connection between the controller device 120 and the light string 325 may include a current transferring conduit (e.g., wire) for each light node 325A-F to receive current to power the light nodes. The connection between the controller device 120 and the light string 325 may further utilize the bus configuration and include an address line 405 and a bus 410. The address line 405 and the bus 410 may provide conventional communication transfers of signals or data between the controller device 120 and the light nodes of the lighting array 300. As will be described in detail below, the address line 405 may be a communication pathway for signals from the controller device 120 to the light nodes and the bus 410 may be a communication pathway for signals to be returned to the controller device 120 from the light nodes.

During the commissioning process where the controller device 120 uses the address line 405 to establish a sequence of the light nodes 325A-F, only one node in the lighting array 300 is commissioned at a time to assign the address of the selected node. Therefore, each light node and splitter will react appropriately to signals on the address line that is dedicated to the commissioning process. As noted above, the commissioning process may be performed at a variety of times, such as upon installation, after a redesign, or after a repair. The response of both the light nodes and the splitters to signals on the address line 405 should be performed in a predetermined manner for the commissioning process to be performed properly. Accordingly, the exemplary embodiments utilize a set of rules for the commissioning process. The light nodes and the splitters either process signals on the address line or forward the signals to subsequent nodes in accordance with the set of rules. As will be described in detail below, in accordance with the set of rules, the splitters forward the signals on the address line to only one of its multiple outputs.

It is noted that during normal operation, a splitter exchanges signals on the address line 405 and the bus 410 to connected light strings. Furthermore, this exchange of signals does not require that the splitter interpret the data in any way. Instead, the splitter simply reads the signal and forwards the signal to the correct output. Thus, the protocol on the address line 405 and the bus 410 may change without affecting the functionality of the splitter. Again, the daisy chained address line is only used during the commissioning process, which is typically at the time of installation, system redesign, or system repair.

Initially, the operations of the controller device 120 in the commissioning process will be described. The controller device 120 via the commissioning application 235 may transmit different types of signals via the address line 405. A first type of signal may be an address signal. The address signal may be used in commissioning the light nodes one at a time. The address signal may be asserted on the address line 405 in a continuous manner until the commissioning process is completed. While data is being returned on the bus 410 from the light nodes, the controller device 120 may continue to transmit the address signal on the address line 405. When all light nodes of a light string have been commissioned, the address signal may still continue to be transmitted but no further data may be returned on the bus 410 because all light nodes have been commissioned. When no return data is received for a time out duration, the controller device 120 may continue to transmit the address signal but utilize a further operation which is described in greater detail below. Thus, when the commissioning process is initiated, the controller device 120 may begin by transmitting the address signal.

A second type of signal may be a splitter signal. As noted above, the controller device 120 may utilize a further operation, when the controller device 120 has determined no return data has been received for a time out period, the controller device 120 may generate and transmit the splitter signal. The splitter signal is designed to be used by any downstream splitter to select an output upon which a subsequent address signal is to be transmitted. The splitter signal may also be transmitted on the address line 405. In a first manner of utilizing the splitter signal, the controller device 120 may transmit the splitter signal on the address line 405 for a predetermined or dynamically determined time period (e.g., sufficient time period for the splitter signal to have reached the intended splitter). In a second manner of utilizing the splitter signal, the controller device 120 may receive data returned on the bus 410 from the intended splitter. Thus, the splitter may also be connected to the address line 405 and the bus 410. When the controller device 120 has transmitted the splitter signal for the time period or received the return data, the continued transmission of the address signal may be used to commission further light nodes that are connected after the splitter. It is noted that, unlike the light nodes, the splitters do not have distinct addresses, even after the commissioning process. Thus, the splitters may be replaced without recommissioning the system. Accordingly, the behavior of the splitter during the commissioning process is dictated purely by the signal pattern and included data that is detected on the input of the address line 405.

The splitter signal may differ from the address signal. As described above, the address signal may be transmitted in a continuous manner without interruptions. In contrast, the splitter signal may be transmitted with a pattern for a duration within the time used for the commissioning process. For example, the splitter signal may be transmitted with interruptions. Those skilled in the art will understand that any number of methods may be used to encode the pattern onto the address line 405. For example, the pattern may be a bit pattern such as Manchester encoding, differential Manchester encoding, various return to zero (RTZ) techniques, non-return to zero (NRZ), non-return to zero invertive (NRZI), bipolar, pseudoternary, etc. As will be described in detail below, the continuous stream associated with the address signal and the signal pattern associated with the splitter signal may be used by the light nodes and the splitters to determine the proper operation to be performed when receiving either of these signals.

As described above, the splitter signal may be transmitted for a predetermined time period. When the splitter signal is transmitted for a predetermined time period, the duration of the predetermined time period may be set for a minimum amount. In a first example, the splitter signal may be transmitted until an entire light string has been commissioned and the light nodes of the light string are assigned an address. For example, the splitter signal may be transmitted until the address signal times out. In a second example, the splitter may not set a path to any output until a splitter signal is received. Once a splitter signal is received, the splitter may set a path to a specified output until another splitter signal is received. Accordingly, under this second example, the duration of the predetermined time period being set to the minimum amount may be to ensure that the splitter signal will be transmitted to the intended splitter. For example, the predetermined time period may be a single value that is always used when the splitter signal is transmitted. In another example, the predetermined time period may be a plurality of different values based on a splitter level. The splitter level may refer to a number of splitters from the controller device 120. For example, referring to FIG. 3, the splitter 305 may be a first level; the splitters 310, 320 may be a second level; and the splitter 315 may be a third level. Based on the splitter level, the predetermined time period may be selected accordingly (e.g., a table stored in the memory 210). When the splitter signal is transmitted for a dynamically determined time period, the duration may be set based on a distance to be traveled by the splitter signal. For example, the commissioning process may identify a number of light nodes and a number of splitters (e.g., splitter level) that the splitter signal must traverse to reach the intended splitter. Based on this distance, the controller device 120 may determine a minimum time period in which the splitter signal is to be transmitted to ensure that the intended splitter receives the splitter signal.

The address signal and the splitter signal may also differ in the manner these signals are generated. For example, the address signal may be any signal including any number of bits or data that triggers the light node to perform an operation that returns data to the controller device 120 on the bus 410. As will be described below, the continuous asserting of the address line 405 may indicate to the light node that an address signal is being received which enables the light node to return data on the bus 410. In contrast, the splitter signal may be generated based on the splitter level. As will become apparent below, the splitter signal may include one or more segments, a size of each of the segments being determined by the number of outputs of the splitter, information in each of the segments identifying an output for subsequent signals to be transmitted. For example, a splitter with two outputs may utilize a two bit segment where "01" may indicate output A while "10" may indicate output B. For example, if the splitter is in the first level and the intended recipient of the splitter signal, the splitter signal may include the two bit segment. However, if the splitter is in the second level or a further level and the intended recipient of the splitter signal, the splitter signal may include a plurality of segments, examples of which will be described below.

As noted above, for the commissioning process to occur in a controlled way given the mechanism in which the controller device 120 operates, a set of rules is followed by the light nodes and the splitters. As noted above, the light nodes and the splitters may be configured to determine the signal being transmitted on the address line 405 and react accordingly (e.g., continuous asserting or signal pattern detection). The light nodes and the splitters decode signals on the address line 405 from the controller device 120. The lighting array 300 having any number of splitters may obey the following set of exemplary rules. The rules described below are with regard to splitters having two outputs. However, as will be described, the exemplary rules may be modified for use with splitters having any number of outputs or even a combination of the splitters having different numbers of outputs.

A first exemplary rule (hereinafter referred to as "Rule 1") may be directed to how the light nodes operate. Specifically, Rule 1 may define that when a light node detects that the address signal is asserted continuously for some fixed period, t, on the address line 405, the light node transmits data on the bus 410 to establish a system specific commission process. This results in the assignment of a system address relative to the light node's sequential position on the string or tree structure. As noted above, only a single light node is commissioned at a time. Thus, the light node (e.g., light node 325A) that is being commissioned under Rule 1 determines the address signal is continuously asserted on the address line 405 (e.g., the address line 405 goes "high" continuously for t) and utilizes the bus 410 to return data that the light node has identified that it is being commissioned. Rule 1 may include a further operation. Specifically, when the light node has transmitted the data back to the controller device 120 on the bus 410, the light node may utilize the output on the address line 405 to forward for subsequent address signals being received.

A second exemplary rule (hereinafter referred to as "Rule 2") may also be directed to how the light nodes operate. Specifically, Rule 2 may define that when a light node detects a signal pattern on the address line 405, the light node simply repeats the signal pattern on the output of the address line 405 and takes no further action. Since the signal pattern is associated with splitter operations, the light nodes may simply ignore the signal pattern and perform only a forwarding operation. As will become apparent below, Rule 2 may assume that the light nodes utilize the output on the address line 405 since the light nodes receiving the signal pattern are already commissioned.

A third exemplary rule (hereinafter referred to as "Rule 3") may be directed to how the splitters operate. Specifically, Rule 3 may define that when a splitter detects the address line 405 asserted continuously for some fixed period with the address signal (without any splitter signal having been received), the splitter ignores the signal. By the splitter ignoring the address signal when asserted continuously, the splitter may cause a time out to occur as no return data is transmitted back to the controller device 120. For example, when a final light node on a light string is commissioned, the address signal continues to be transmitted since the final light node on the light string will forward the address signal on the output of the address line 405. When a splitter is connected to the light string (e.g., after the last light node), the address signal that is being received by the splitter is ignored. This means that the controller device 120 will receive no return data in response to the address signal and the address signal time out will occur. As described above, the controller device 120 may transmit the splitter signal when the time out is determined. Rule 3 may include a further condition. Specifically, when the splitter has received a splitter signal, the splitter may then repeat the address signal on the identified output defined in the splitter signal. In this manner, only splitters that have not yet received a splitter signal ignore the address signal. Thus, the time outs occurring based on the address signal may be used by the controller device 120 in generating/transmitting splitter signals and also determining when the commissioning process has terminated. Specifically, as will be described in an example below, when each branch of the tree structure results in a time out of the address signal and the splitter signal, the controller device 120 may determine that the commissioning process has ended and addresses for all light nodes are assigned.

A fourth exemplary rule (hereinafter referred to as "Rule 4") may also be directed to how the splitters operate. Specifically, Rule 4 may define how the splitters utilize an incoming splitter signal. As described above, the splitter signal may include one or more segments. Accordingly, Rule 4 may include two parts: Rule 4a when more than one segment is present in the splitter signal and Rule 4b when only one segment is present in the splitter signal. According to Rule 4a, when a splitter identifies a signal pattern on the address line 405 (e.g., a splitter signal) and when the data in the splitter signal is longer than one segment, the splitter determines the proper action based on the value of the last segment. For example, in the case of a splitter with two outputs, the bit pattern on the last segment of the splitter signal may be 01, 10, 11, or 00. When the last segment is 11 or 00, the splitter ignores the splitter signal. If the splitter signal is 01, the splitter removes the last segment from the splitter signal and forwards the signal pattern to a first output (e.g., output A). If the splitter signal is 10, the splitter removes the last segment from the splitter signal and transmits the signal pattern to a second output (e.g., output B). By removing the last segment, the splitter signal has one less segment and the last segment now on the remaining splitter signal is the second to last segment that was included in the splitter signal that was received by the splitter. Therefore, a splitter further downstream performs the same operation if the remaining splitter signal has two or more segments and utilizes the last segment in the remaining splitter signal. According to Rule 4b, when a splitter sees a signal pattern on the address line and when the data in the splitter signal is only one segment, the splitter determines the proper action based on this one segment. Again, in the case of a splitter with two outputs, the bit pattern on the one segment of the splitter signal is either 01, 10, 11, or 00. When the last segment is 11 or 00, the splitter ignores the splitter signal. If the splitter signal is 01, the splitter transmits the address signal to a first output (e.g., output A). If the splitter signal is 10, the splitter transmits the address signal to a second output (e.g., output B).

As noted above, when the splitter includes more than two outputs, the controller device 120 may generate a bit pattern to accommodate the further output(s). For splitters with more than 2 outputs, the number of bits in each segment encoded and then decoded and removed by each level of splitter in the system may be increased. The maximum number of outputs on a splitter relative to the number of bits required in the segment for each "depth" level of the lighting array 300 may be defined as OUTPUTS=(2^B) where B is the number of bits for each level. Thus, 2 bits are capable of supporting splitters with up to 4 outputs, 3 bits are capable of supporting splitters with up to 8 outputs, etc. The maximum number of outputs allowed per bit may be reduced for a specific implementation depending on the type of bit encoding employed, as the nodes and splitters need some way to differentiate an encoded bit pattern from the address signal transmitted for the fixed time period oft. In a substantially similar manner, a maximum number of splitters supported in this fashion may be SPLITTERS=(2^LEVELS)−1.

It is noted that the above rules are only exemplary. The exemplary embodiments may be modified to utilize these rules and/or other rules that may provide operations in assigning addresses to light nodes.

Using the above rules and the mechanism by which the controller device 120 operates, the light nodes in the lighting array 300 and ultimately the lighting arrangement 110 may be determined. That is, the exemplary embodiments provide a dynamic, automated mechanism of determining the addresses of light nodes in the lighting arrangement 110 even when the lighting arrangement 110 includes one or more splitters. To illustrate the manner in which the exemplary embodiments provide this functionality, a specific example is described herein that is directed to the entire lighting array 300. However, it is again noted that the use of the lighting array 300 is only exemplary and the rules and controller device mechanism may be applied to any lighting arrangement 110 to determine all addresses of the light nodes therein.

Figure 6A:
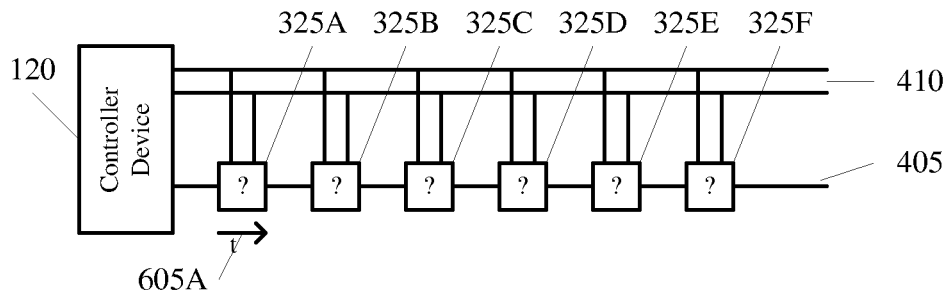
FIGS. 6A-O show a sequence of commissioning light nodes in a lighting arrangement including splitters according to the exemplary embodiments.

FIGS. 6A-O show a sequence of commissioning light nodes in a section of the lighting array 300 including splitters 305, 310 according to the exemplary embodiments. The sequence illustrated in FIGS. 6A-O will be described with regard to the lighting array of FIG. 3. For illustrative purposes, the splitter 320 and the light string 355 are not included in FIGS. 6A-O. However, a description for these components will be included.

As illustrated in the lighting array 300 of FIG. 3, the controller device 120 is connected (e.g., via the current driver device 115) to the light string 325 at an end corresponding to the light node 325A. As noted above, when the commissioning process is initiated, the controller device 120 may begin with asserting the address signal on the address line 405. The address signal is transmitted over the address line 405 continuously with no interruptions. The address signal will be transmitted until the commissioning process has ended.

Figure 6B:
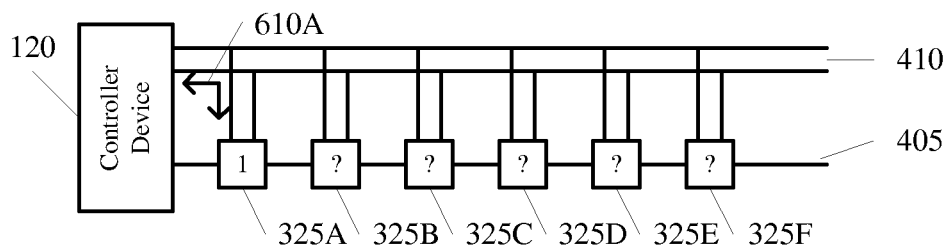

According to Rule 1, the light node 325A receives the address signal on the input of the address line 405. As shown in FIG. 6A, the light node 325A recognizes that the address signal is being asserted on the address line by receiving the address signal via its input for at least a time period t (denoted as 605A). At this point, the output of the address line 405 is not being utilized by the light node 325A. Once the light node 325A has detected that the input on the address line 405 has been asserted with the address signal for the time period t, the light node 325A initiates its commissioning process. Specifically, as shown in FIG. 6B, the light node 325A transmits system specific data on the bus 410 to the controller device 120 (denoted as 610A). When this occurs, the controller device 120 commissions the light node 325A and assigns the address for the light node 325A (e.g., a logical address such as "1" as the light node 325A is the first light node of the array 300 to be commissioned). Rule 1 also includes that the light node 325A utilizes the output of the address line 405 to forward the address signal beyond the light node 325A.

Figure 6C:
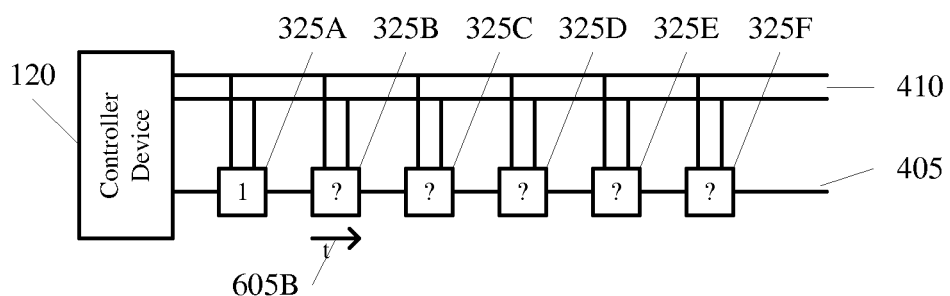
Figure 6D:
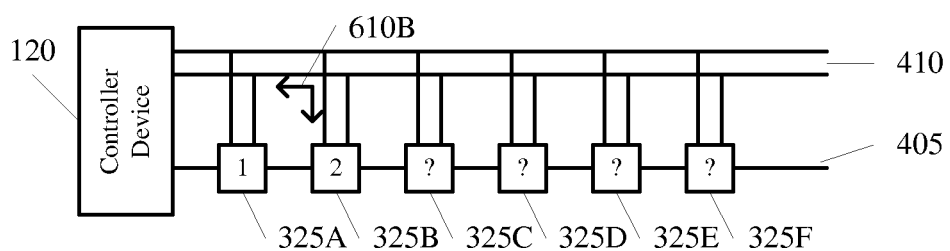

As illustrated in FIG. 6C, when the light node 325A utilizes its output on the address line 405, the light node 325B may then receive the address signal on its input of the address line 405. In a substantially similar manner as the light node 325A, the light node 325B may determine that the address line 405 is asserted for the time period t (denoted as 605B). As shown in FIG. 6D, the light node 325B may then initiate its commissioning process by transmitting system specific data on the bus 410 to the controller device 120 (denoted as 610B). The controller device 120 commissions the light node 325B and assigns the address for the light node 325B (e.g., a logical address such as "2"). Again, Rule 1 includes that the light node 325B utilizes the output of the address line 405 to forward the address signal to the next light node.

Figure 6E:
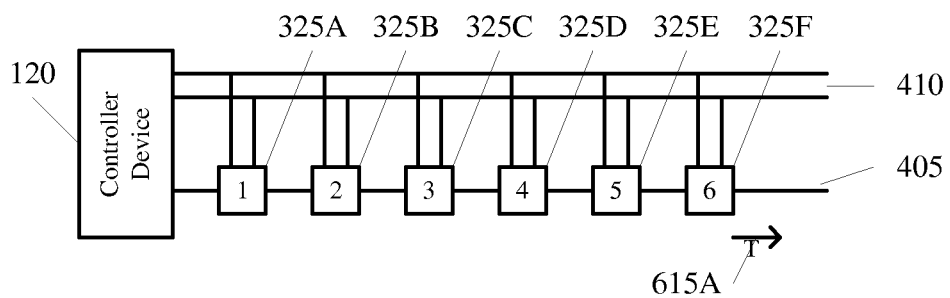

By continuing the above procedure, each light node of the light string 325 may be commissioned. As shown in FIG. 6E, the light node 325C may be assigned an address "3"; the light node 3235D may be assigned an address "4"; the light node 325E may be assigned an address "5"; and the light node 325F may be assigned an address "6".

Once all the light nodes 325A-F of the light string 325 are commissioned, the light node 325F utilizes the output of the address line 405. As shown in FIG. 6E, the address signal may continue to be asserted on the address line 405 (denoted as 615A). However, the next component along this connection is the splitter 305 (see FIG. 3). The splitter 305 receives the address signal on the input of the address line 405. According to Rule 3, since the splitter 305 has not received a splitter signal, the splitter 305 simply ignores the address signal. With the splitter 305 ignoring the address signal, the controller device 120 may eventually determine that a duration of time has passed since the controller device 120 has received return data. Thus, the time out duration (e.g., a time T) has been satisfied. The time out duration may be any predetermined amount of time that ensures that the time out is intended.

Figure 6F:
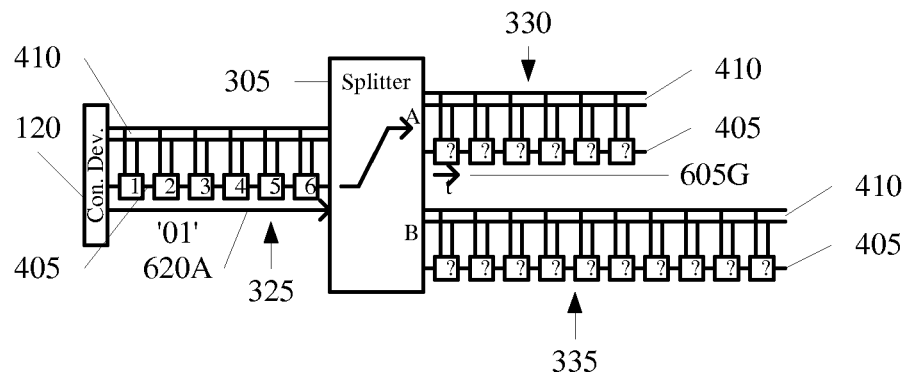
Figure 6G:
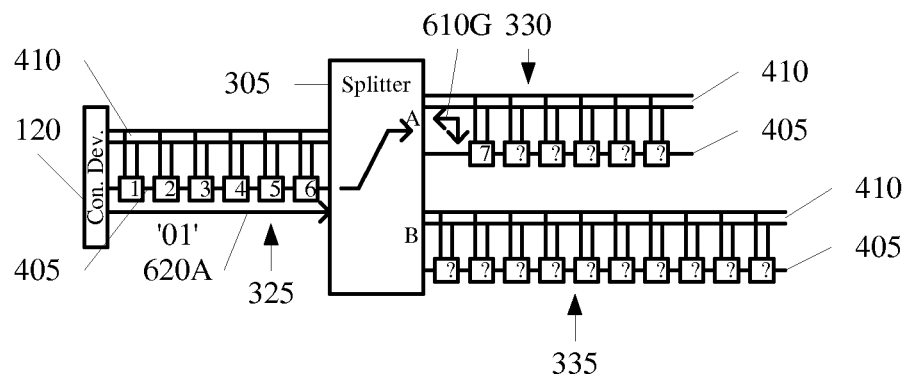
Figure 6H:
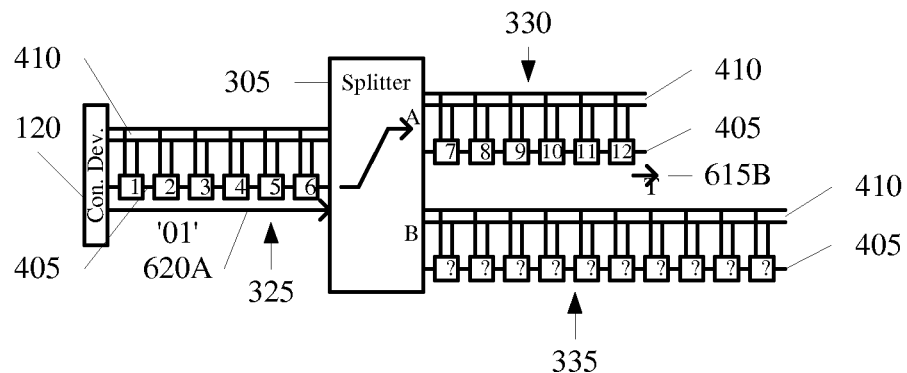

As shown in FIGS. 6F-H, the controller device 120 may now attempt to determine if there is a splitter at the end of the light string 325 and whether a further light string is connected to the splitter. Specifically, while the address signal continues to be transmitted, the controller device 120 may generate and transmit the splitter signal on the address line 405. Thus, the controller device 120 may first determine whether a splitter exists and whether a light string is connected to the first output of the splitter (e.g., output A). For the purpose of this example, it will be assumed that all splitters 305-320 include two outputs, but as described above, the exemplary embodiments may accommodate any number of splitter outputs.

As described above, the controller device 120 may generate the splitter signal with a segment. The controller device 120 may utilize a counter to track the splitter level. The splitter level may initially be set to 1 for the first splitter level. When generating the splitter signal, the controller device 120 may reference the counter. Since the commissioning process is at the first splitter level, the controller device 120 may generate the splitter signal with only a single segment. As shown in FIG. 6F, the controller device 120 may utilize the splitter signal 620A which includes the single segment having bit pattern '01'. Specifically, since the controller device 120 is also attempting to determine whether a light string is connected to the first output, the splitter signal may include the bit pattern 01. In accordance with Rule 2 above and as shown in FIG. 6F, the light nodes 325A-F on the light string 325 all pass this splitter signal pattern onward until the signal pattern either terminates at the last node (via a time out) or is transmitted to a downstream splitter. In this case, the splitter signal is received by the splitter 305. When the splitter 305 receives the splitter signal, the splitter 305 processes the bit pattern in accordance with Rule 4 above. Since the bit pattern includes only one segment, the splitter 305 uses Rule 4b and determines that the data identifies the first output of the splitter 305 (e.g., output A). Thus, the splitter 305 is set to forward any incoming signal (e.g., the address signal) to the first output.

With the address signal continuing to be transmitted and with the splitter 305 setting the connection from the light string 325 to the first output, any light string connected to the first output may now receive the address signal. As shown in FIG. 6F, the light string 330 may receive the address signal that is being asserted on the address line 405. Thus, the light node 330A may receive the address signal for at least the time period t (as denoted as 605G). As shown in FIG. 6G, the light node 330A of the light string 330 may return the system specific data on the bus 410 to the controller device 120 within the time out duration for the address signal (denoted as 610G). Thus, the controller device 120 may realize that there is a light string on the first output of the splitter 305 and continue the commissioning process. Accordingly, as shown in FIG. 6H, the light nodes 330A-F may be commissioned in a substantially similar manner as the light nodes 325A-F. Thus, the light node 330A may be assigned an address "7"; the light node 330B may be assigned an address "8"; the light node 330C may be assigned an address "9"; the light node 330D may be assigned an address "10";
the light node 330E may be assigned an address "11"; and the light node 330F may be assigned an address "12".

Once all the light nodes 330A-F of the light string 330 have been commissioned, the address signal may continue to be asserted using the output of the light node 330F (denoted as 615B). Thereafter, when all the light nodes 330A-F have been commissioned, the address signal reaches the splitter 310 (see FIG. 3). As noted above and under Rule 3, when the splitter 310 receives an address signal but has never previously received a splitter signal, the splitter 310 simply ignores the address signal. This results in no system specific data being returned to the controller device 120 on the bus 410 until the time out is reached (e.g., time T).

The controller device 120 may then replace the first splitter signal (e.g., 620A) and generate and transmit a next splitter signal 620B for the second output of the splitter 305. Based on the controller device 120 knowing that the splitters have two outputs and the splitter level currently being the first splitter level, the controller device 120 may transmit the next splitter signal to determine whether there is a light string on the second output of the splitter 305. Specifically, the controller device 120 may generate and transmit a splitter signal including the bit pattern 10.

Figure 6I:
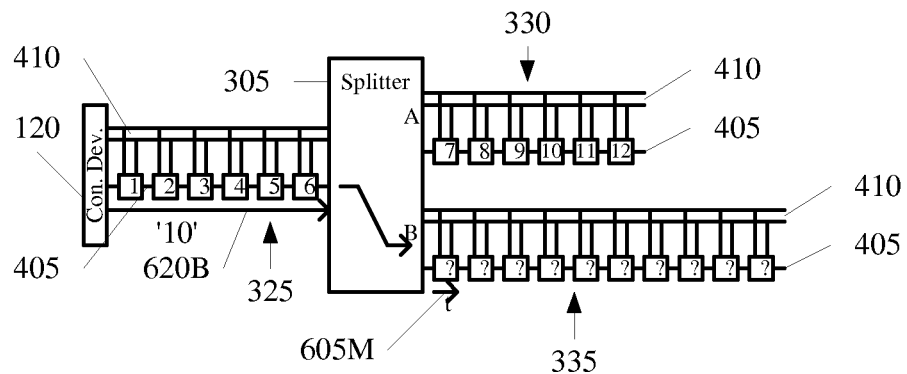
Figure 6J:
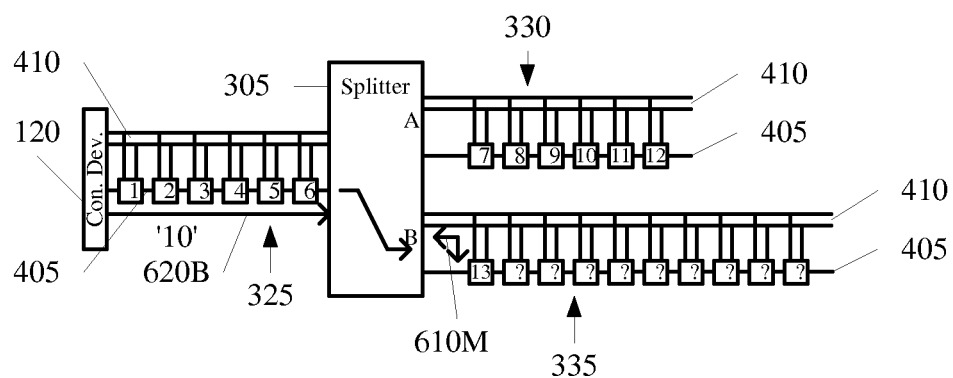
Figure 6K:
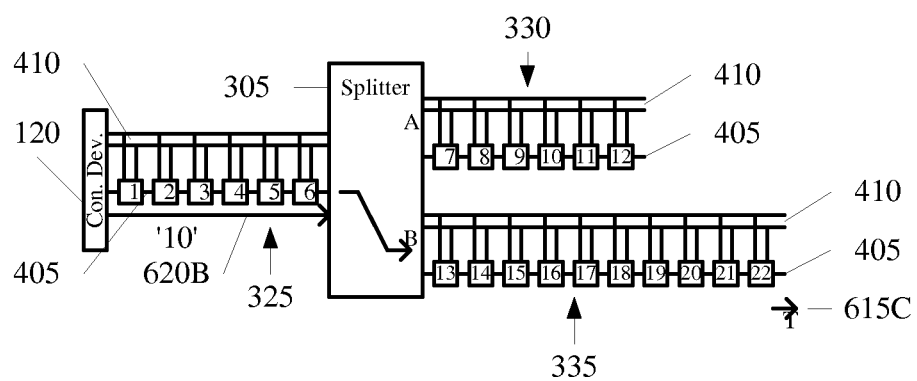

In accordance with Rule 2 above and as shown in FIG. 6I, the light nodes 325A-F on the light string 325 all forward this splitter signal to the splitter 305. When the splitter 305 receives the splitter signal including the bit pattern 10, the splitter 305 processes the bit pattern in accordance with Rule 4b and determines that the data identifies the second output (e.g., output B). Thus, the splitter 305 is set to forward any incoming signal to the second output. Again, with the address signal continuing to be transmitted and with the splitter 305 setting the connection from the light string 325 to the second output and as shown in FIGS. 6I-J, the light nodes 335A-J of the light string 335 may receive the address signal (denoted as 605M) and may then be commissioned in a substantially similar manner as described above (denoted as 610M). Specifically, as shown in FIG. 6K, the light node 335A may be assigned an address "13"; the light node 335B may be assigned an address "14"; the light node 335C may be assigned an address "15"; the light node 335D may be assigned an address "16"; the light node 335E may be assigned an address "17"; the light node 335F may be assigned an address "18"; the light node 335G may be assigned an address "19"; the light node 335H may be assigned an address "20"; the light node 335I may be assigned an address "21"; and the light node 335J may be assigned an address "22". Thereafter, the address signal may continue to be asserted on the address line 405 (denoted as 615C).

When all the light nodes 335A-J have been commissioned, the address signal may be transmitted to the splitter 320. However, since the splitter 320 has not previously received any splitter signal, the splitter 320 ignores the address signal which results in a time out occurring for the splitter signal having the data 10.

Figure 6L:
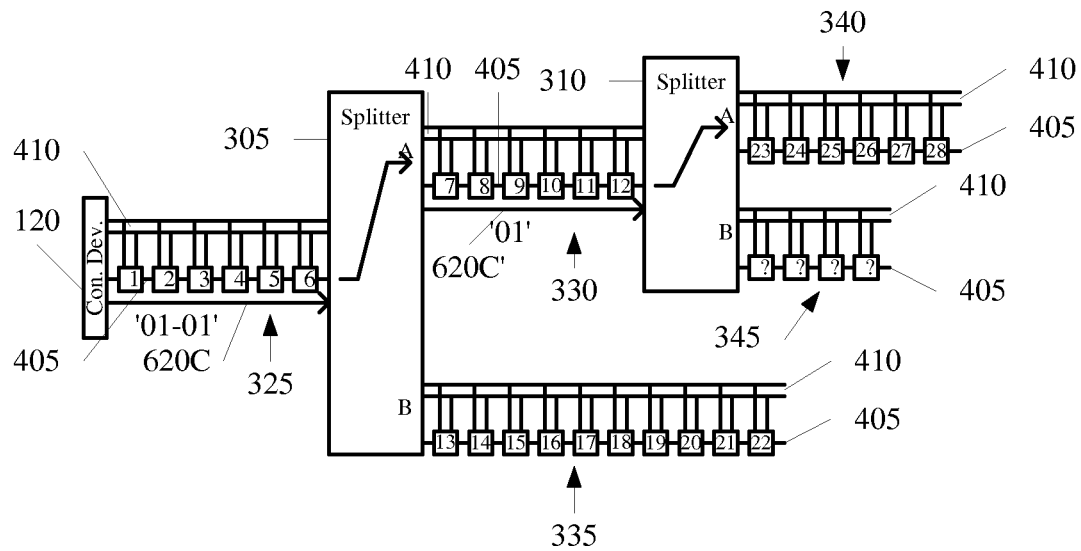
Figure 6M:
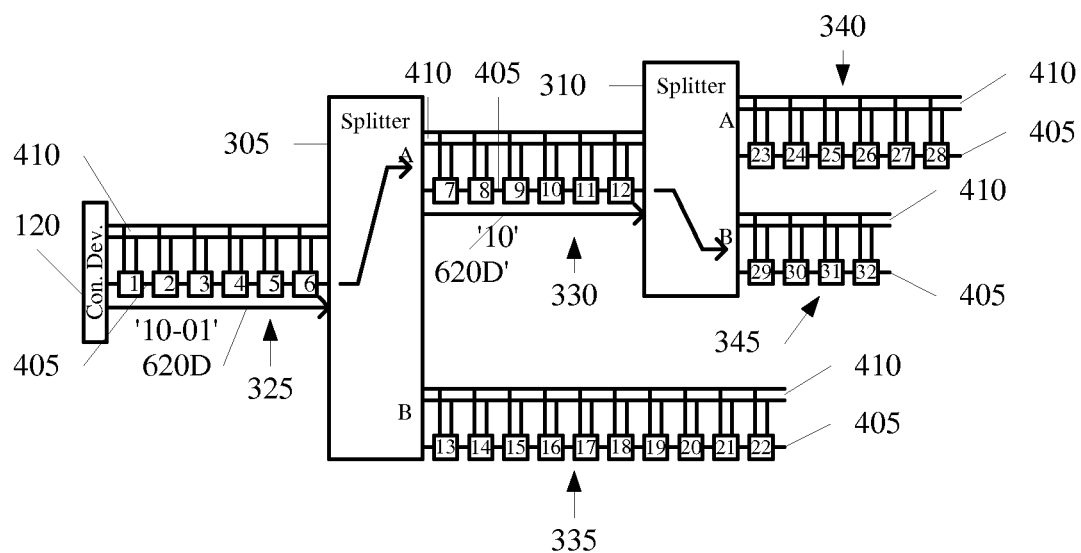

As shown in FIGS. 6L-M, the controller device 120 may now attempt to determine if there is a further splitter at the end of the light string 330 and whether a further light string is connected to the splitter. Initially, the controller device 120 may be aware that all direct branches from the splitter 305 have been commissioned. Specifically, with two outputs, the controller device 120 only needs to transmit the first splitter signal having the bit pattern 01 and the second splitter signal having the bit pattern 10. With all branches being commissioned, the controller device 120 may increase the counter by 1 such that the counter now indicates that the commissioning process has commenced to the second level of splitters. While the address signal continues to be transmitted, the controller device 120 may generate and transmit the next splitter signal on the address line 405 for the second splitter level.

Specifically, as shown in FIG. 6L, the controller device 120 may generate and transmit the splitter signal 620C.

In this case, the controller device 120 may generate the splitter signal 620C having two segments with the bit pattern 01-01. As shown in FIG. 6L, when this splitter signal is transmitted over the address line 405, the light nodes 325A-F pass the splitter signal to the splitter 305. The splitter 305 receives and processes this splitter signal. Since the splitter signal includes more than one segment, the splitter 305 utilizes Rule 4a. Specifically, the splitter 305 takes the last segment having the bit pattern of 01 to determine that the connection from the light string 325 is to be made with output A. The splitter 305 also removes this last segment such that the remaining splitter signal has a bit pattern of 01.

Accordingly, the splitter signal 620C is converted to splitter signal 620C' which has a remaining bit pattern of 01. When this remaining splitter signal is transmitted over the address line 405, the light nodes 330A-F pass the splitter signal to the splitter 310. The splitter 310 receives and processes this splitter signal. Since the splitter signal includes only one segment, the splitter 310 utilizes Rule 4b. Specifically, the splitter 310 determines that the connection from the light string 330 is to be made with output A. In this manner, the address signal is transmitted to the light string 340. The light nodes 340A-F may then be commissioned in the manner described above. Specifically, the light node 340A may be assigned an address "23"; the light node 340B may be assigned an address "24"; the light node 340C may be assigned an address "25"; the light node 340D may be assigned an address "26"; the light node 340E may be assigned an address "27"; and the light node 340F may be assigned an address "28". When the light nodes 340A-F have been commissioned, the time out occurs which prompts the controller device 120 to transmit the next splitter signal.

As shown in FIG. 6M, the next splitter signal 620D may have a bit pattern 10-01. Since the controller device 120 is aware that the commissioning process is at the second splitter level, the other output of the intended splitter 310 is also verified. With the bit pattern 10-01, the light nodes 325A-F pass the splitter signal to the splitter 305. Under Rule 4a, the splitter 305 processes the signal pattern and removes the last segment of 01. Thus, the connection from the light string 325 is made with output A of the splitter 305. The splitter signal 620D is then converted to splitter signal 620D'. The remaining splitter signal 620D' with bit pattern 10 is transmitted on the address line 405. The light nodes 330A-F pass the remaining splitter signal to the splitter 310. The splitter 310 receives and processes the remaining splitter signal having bit pattern 10 under Rule 4b and determines that the connection from the light string 330 is to be made with output B of the splitter 310. In this manner, the light nodes 345A-D of the light string 345 may be commissioned. Specifically, the light node 345A may be assigned an address "29"; the light node 345B may be assigned an address "30"; the light node 345C may be assigned an address "31"; and the light node 345D may be assigned an address "32". When all the light nodes 345A-D have been commissioned, a time out may occur since the splitter 315 has not received any previous splitter signal.

When this time out occurs, the controller device 120 may now determine if there are any downstream splitters on the second output of the splitter 305. That is, the controller device 120 determines whether there is a further splitter on the second splitter level. For this scenario, the controller device 120 may generate and transmit the next signal pattern including the splitter signal having bit pattern 01-10. Thus, when the splitter 305 receives this splitter signal, the last segment of 10 is removed and processed for the address signal to be transmitted through output B of the splitter 305. When the splitter 320 receives the remaining splitter signal, the splitter 320 processes the splitter signal including the bit pattern 01 and determines that the connection from the light string 335 is to be made with output A.

As illustrated in the lighting array 300, the output A of the splitter 320 has no connected light string. Thus, a time out occurs for the splitter signal including the bit pattern 01-10. However, the controller device 120 may still verify whether the other output of the splitter 320 has a connected light string. That is, the controller device 120 should not assume that there is no light string attached to output B simply from a time out occurring from the first output A. The controller device 120 may therefore generate and transmit a next splitter signal including a bit pattern of 10-10. Thus, when the splitter 305 receives this splitter signal, the last segment of 10 is removed and processed for the address signal to be transmitted through output B of the splitter 305. When the splitter 320 receives the remaining splitter signal, the splitter 320 processes the splitter signal including the segment 10 and determines that the connection from the light string 335 is to be made with output B. In this case, the light node 355A returns the system specific data within the time out duration.

Accordingly, each of the light nodes 355A-F of the light string 355 are commissioned. Once each of the light nodes 355A-F are commissioned, the address signal times out.

The controller device 120 then adds 1 to the counter to indicate that the commissioning process is at the third splitter level. Therefore, each splitter signal has data including three segments. The controller device 120 also knows that there are now eight total branches to consider (two branches if there is a splitter connected to light string 340, two branches if there is a splitter connected to light string 345, two branches if there is a splitter connected to a light string connected to output A of splitter 320, and two branches if there is a splitter connected to light string 355). The controller device 120 may modify this total branches since a time out occurred with output A of splitter 320. Thus, there are actually only six total branches to consider.

The first splitter signal generated and transmitted for the third splitter level may include three segments. Specifically, the bit pattern included in the splitter signal may be 01-01-01. Thus, when the splitter 305 receives the splitter signal, the last segment 01 is removed and processed. The first remaining splitter signal including the bit pattern 01-01 is transmitted to the splitter 310. The splitter 310 removes and processes the last segment 01 of the remaining splitter signal. The second remaining splitter signal including the bit pattern 01 is transmitted over the light string 340. However, as there is no splitter connected to the end of the light string 340 at the end with the light node 340F, a time out occurs for the splitter signal including the original bit pattern of 01-01-01. When such a time out occurs, the controller device 120 still should not assume that there is no splitter along this path in a manner substantially similar to splitter 320. Therefore, the signal pattern including the splitter signal having data 10-01-01 is then generated and transmitted. However, this too results in a time out.

The controller device 120 then continues to the next set of branches.

Specifically, as shown in FIG. 6N, the controller device 120 generates and transmits a splitter signal 620E having a bit pattern of 01-10-01. When the splitter 305 receives the splitter signal, the last segment 01 is removed and processed. The first remaining splitter signal including the bit pattern 01-10 is received by the splitter 310. The splitter 310 removes and processes the last segment of 10. The second remaining splitter signal 620E" including the bit pattern 01 is received by the splitter 315. Thus, the address signal is transmitted to the light string 350. Once all the light nodes 350A-F of the light string 350 are commissioned, the time out occurs. Thereafter, as shown in FIG. 6O, the controller device 120 generates and transmits the next splitter signal 620F having bit pattern 10-10-01. As the splitter signal 620F passes splitter 305, 310, and 315, the splitter signal 620F converts to splitter signal 620F' (having bit pattern 10-10) which converts to splitter signal 620F" (having bit pattern 10). In this case, the output B of the splitter 315 has no connected light string and this splitter signal results in a time out.

The next set of splitter signals relates to the output B of the splitter 305 and the outputs of the splitter 320. As noted above, the controller device 120 knows that there was a time out for output A of the splitter 320. Thus, the controller device 120 may ignore determining a third level splitter along this path. Instead, the controller device 120 may generate and transmit a splitter signal having a bit pattern of 01-10-10. Therefore, the splitter 305 receives this splitter signal, then removes and processes the last segment 10. The first remaining splitter signal is received by the splitter 320. The splitter 320 removes and processes the last segment 10. The second remaining splitter signal is passed through the light string 355. With no further splitter, a time out occurs for the splitter signal having a bit pattern of 01-10-10. Again, the controller device 120 transmits the splitter signal for the other branch (e.g., splitter signal having bit pattern 10-10-10) but determines a time out.

The controller device 120 adds another 1 to the counter to indicate that the fourth splitter level is reached. Although there are potentially sixteen branches that may be created with splitters having two outputs, the controller device 120 may omit fourteen of these branches due to the time outs registered with light string 340, output B of splitter 315, output A of splitter 320, and light string 355. Thus, the only pathway to be considered is through the light string 350. Accordingly, the controller device 120 may generate and transmit a splitter signal having a bit pattern of 01-01-10-01. When the splitter 305 receives this splitter signal, the last segment 01 is removed and processed. When the splitter 310 receives the first remaining splitter signal having a bit pattern of 01-01-10, the last segment 10 is removed and processed. When the splitter 315 receives the second remaining splitter signal having a bit pattern of 01-01, the last segment 01 is removed and processed. The third remaining splitter signal having a bit pattern of 01 is passed through the light string 350. However, with no splitter connected to the light string 350, a time out occurs. Again, the controller device 120 generates and transmits a splitter signal having a bit pattern of 10-01-10-01 but this also results in a time out.

When the final time out is received, the controller device 120 may determine that the commissioning process has concluded. Specifically, all outputs of the first splitter level have further connections. Three of the four outputs of the second splitter level have further connections. Specifically, output A of splitter 320 has no subsequent connection. Thus, a time out from output A of splitter 320 concludes further analysis for branches along this pathway. Only one of the eight outputs of the third splitter level has further connections. Specifically, the light string 340, the output B of the splitter 315, and the light string 355 have no subsequent connections. Finally, none of the sixteen outputs of the fourth splitter level has further connections. When the controller device 120 has determined that all possible pathways on branches of the tree structure result in a time out, the controller device 120 concludes the commissioning process as all addresses of the light nodes in the lighting array 300 have been assigned.

Figure 5:
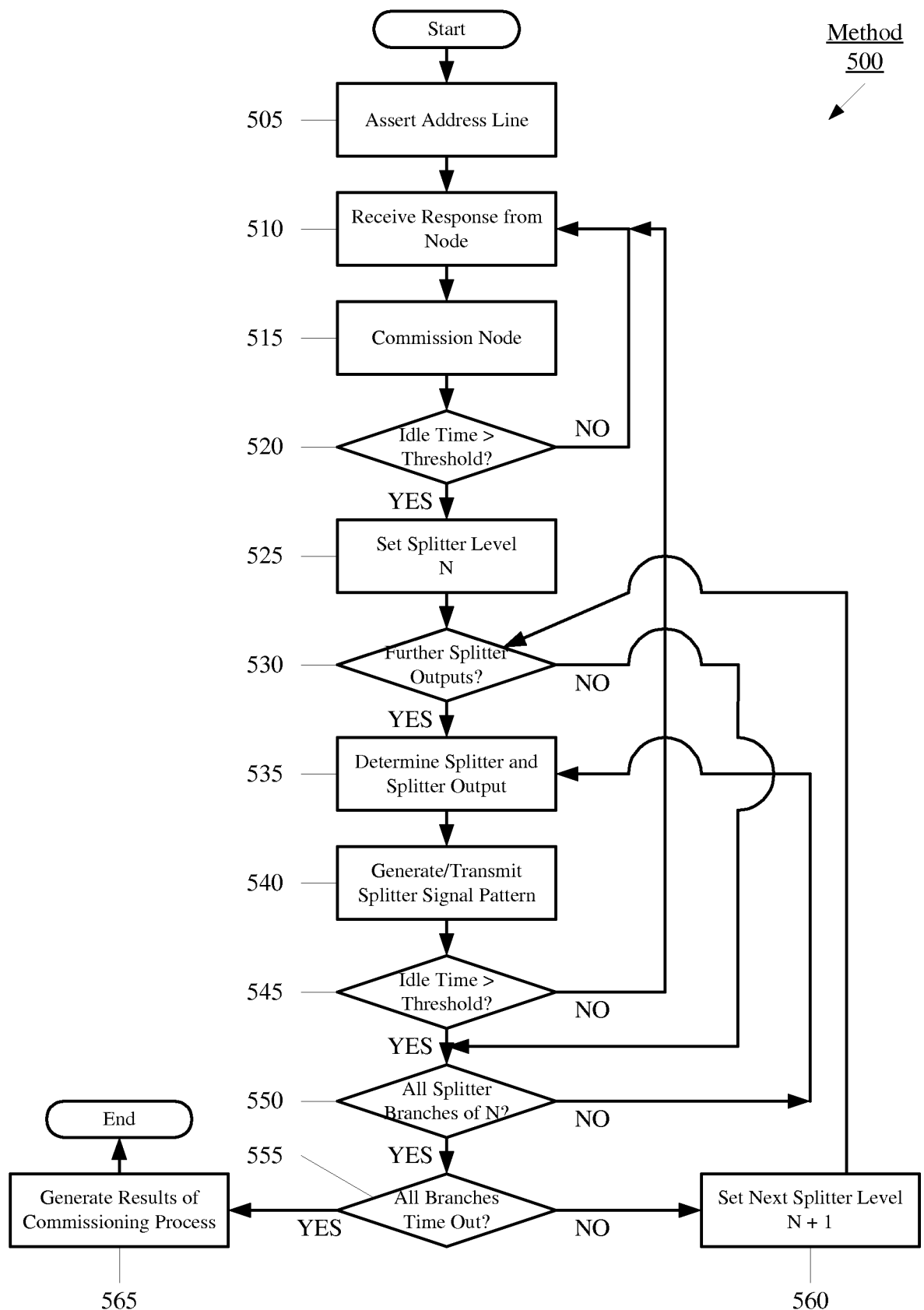
FIG. 5 shows a method for assigning an address for each light node in a lighting arrangement according to the exemplary embodiments.

FIG. 5 shows a method 500 for assigning an address for each light node in a lighting arrangement according to the exemplary embodiments. Specifically, the method 500 may relate to the mechanism of the exemplary embodiments in which the lighting arrangement 110 or lighting arrays therein include at least one splitter such that the lighting array creates a tree structure. Through a daisy chained address line, signals may be exchanged during a commissioning process prior to use of the lighting arrangement 110 so that the addresses of the light nodes are determined and known. The method 500 will be described from the perspective of the controller device 120. The method 500 will also be described with regard to the system 100 of FIG. 1 and the controller device 120 of FIG. 2.

Initially, it is again noted that the method 500 is directed to the commissioning process and may be utilized when the lighting arrangement 110 is installed, redesigned, or repaired. That is, the method 500 may be used at any time prior to actual use of the lighting arrangement 110 for its intended purpose of displaying an illuminated design/animation. Thus, through determining the addresses of the light nodes in the lighting arrangement 110, any design/animation that is input into the system 100 may be properly configured and shown.

In 505, the controller device 120 asserts an address signal on the address line 405. As described above, when the commissioning process is initiated, a first operation performed by the controller device 120 is asserting the address signal on the address line 405. The address signal may be constantly transmitted without interruption during the commissioning process. For example, the address signal may not have any discernible pattern and may simply be a "high" on the address line 405 during the commissioning process.

In 510, the controller device 120 receives a response from a light node. For illustrative purposes, it may be assumed that there is a lighting arrangement including at least one lighting array which includes at least one light node that is connected to the controller device 120 (via the current driver device 115). Thus, when a single light node along the tree structure of the lighting arrangement 110 receives the address signal on the address line 405, an operation at the light node may generate the response that is received by the controller device 120 on the bus 410. In 515, the controller device 120 commissions the light node 325A. As described above, the controller device 120 may assign a relative position or order upon which the responses are received. Thus, the controller device 120 may assign a relative position for the light node 325A as "1".

As noted above, the method 500 is described from the perspective of the controller device 120. However, when considering the operations of the light nodes (e.g., the light node 325A-F of the light string 325), system specific data may be returned on the bus 410 to the controller device 120. This system specific data may be the response received from the light node in 510. The system specific data may be any response signal that is used by the light nodes to indicate to the controller device 120 that the address signal is being received on the address line 405. Several examples of different signal types and encoding schemes were described above that may be utilized for the address signal. Substantially similar types may also be used for the response from the light nodes. Thus, according to Rule 1, when a first light node (e.g., the light node 325A) in the light string 325 arranged in series receives the address signal on the address line 405, the light node 325A determines whether the address signal has been received for a fixed period t. As the output on the address line 405 for the light node 325A is not being used, only the light node 325A has received the address signal.

In this manner, only one light node is commissioned at a time during the commissioning process according to the exemplary embodiments. After the address signal is detected for the fixed period t, the light node 325A generates and transmits the system specific data as a response to the controller device 120 on the bus 410. The light node 325A also asserts the address line 405 via its output so that the next light node in the series (e.g., light node 325B) is capable of receiving the address signal.

Returning to the controller device 120, in 520, the controller device 120 determines whether a time duration after the response from the light node 325A has exceeded an idle time period. Since the address signal is continuously being asserted on the address line 405 and with the commissioned light node utilizing the output on the address line 405, any subsequent light node in series with the commissioned light node receives the address signal and transmits a response on the bus 410. However, when no further light node is present, there is no further response and the idle time exceeds a predetermined threshold. In the present scenario with the light string 325, the light node 325B receives the address signal for the fixed period t and generates/transmits the system specific data back to the controller device 120 on the bus 410 within the predetermined idle threshold. Accordingly, the predetermined idle threshold may be any value that is greater than a minimum (or maximum) time duration in which a light node receives the address signal for the fixed period t as well as transmits the response back to the controller device 120. 510-520 may continue until all light nodes 325A-F in the light string 325 are commissioned by the controller device 120. For example, if the light node 325A is assigned "1", light node 325B is assigned "2"; light node 325C is assigned "3"; light node 325D is assigned "4"; light node 325E is assigned "5"; and light nod e325F is assigned "6". Once commissioned, each output on the address line 405 for the light nodes 325A-F may also be used to assert the address signal.

Once the idle time has exceeded the predetermined idle threshold, the controller device 120 may acknowledge that all light nodes 325A-F in the light string 325 have been commissioned. When all light nodes of the light string 325 are commissioned, the controller device 120 then determines whether a splitter is connected to the end of the light string 325 and whether there is at least one light string connected to such a splitter. In 525, the controller device 120 sets an initial splitter level (e.g., N=1). Since the light string 325 represents the first light string that is connected to the controller device 120, any splitter attached thereto represents a first splitter level.

In 530, the controller device 120 determines whether there are further splitter outputs. In this scenario, since no splitter outputs have been addressed, the controller device 120 determines that there are further splitter outputs. When there are further splitter outputs, in 535, the controller device 120 determines the splitter and splitter output to be used for the commissioning process. For example, the splitter may be splitter 305 and the splitter output may be the output A that is selected in the first splitter level. In 540, the controller device 120 generates and transmits a signal pattern that includes a splitter signal. As noted above, the address signal continues to be asserted on the address line 405. The signal pattern may also be asserted on the address line 405 but with a pattern or with interruptions such that any component that receives the signal pattern may determine that a new signal is being asserted on the address line 405.

Initially, the controller device 120 may generate a particular splitter signal to be included in the signal pattern. Specifically, based on the splitter level (which in this scenario is N=1), the controller device 120 may utilize a one segment splitter signal. For illustrative purposes, it may again be assumed that all splitters in the lighting arrangement 110 has two outputs. Accordingly, the one segment may be a two bit binary value such as 00, 11, 01, or 10. With splitters having two outputs, the controller device 120 may generate the segment as 01 or 10 where 01 is utilized for one output and 10 is utilized for the other output. For illustrative purposes, it may be assumed that the controller device 120 always begins with 01. Thus, the controller device 120 may generate a one segment splitter signal encoded as 01 in the signal pattern.

When the light nodes 325A-F receive the signal pattern, according to Rule 2, the light nodes 325A-F ignore the signal pattern and simply forward the signal pattern on the address line 405 (via the respective output). When the splitter 305 receives the signal pattern, the splitter 305 processes the splitter signal included in the signal pattern to determine how the splitter 305 is to direct any signal being asserted on the address line 405. In this scenario, with the splitter signal being 01, the splitter 305 directs signals to a first output (e.g., the output in which light string 330 is connected). Thus, the address signal being asserted eventually reaches the light string 330, in particular to light node 330A.

In 545, the controller device 120 determines whether an idle time since the signal pattern was transmitted has exceeded a predetermined (or dynamically determined) threshold. As noted above, the threshold may be predetermined as a minimum amount of time that may be necessary for the splitter signal to reach a splitter and for any response to be received back from a light node. The threshold may also be dynamically determined based on a distance for the splitter signal to travel as well as for a distance for a response to travel back to the controller device 120. Since there is a light string 330 that is connected to the first output, a response from the light node 330A is received by the controller device 120 over the bus 410 within the idle threshold. Since a response is received, the controller device 120 returns the method 500 to 510. In this manner, each of the light nodes 330A-F are commissioned and an address is assigned thereto. For example, continuing with the assigned addresses for the light nodes 325A-F of the light string 325, the light node 330A may be assigned "7"; the light node 330B may be assigned "8"; etc. until the light node 330F may be assigned "12".

Once the light nodes 330A-F are commissioned, the idle time exceeds the threshold as determined in 520. In this iteration of the subsequent steps, the splitter level is again set but has not changed. Thus, the splitter level may remain the first splitter level (e.g., N=1). In 530, the controller device 120 determines whether there are further splitter outputs. Since all splitters have two outputs and only the first output has been utilized in the commissioning process, the controller device 120 continues to 535 to determine the splitter output (e.g., output B on splitter 305). Thus, the splitter signal included in the signal pattern may be 10. This process may continue such that the light nodes 335A-J of light string 335 are commissioned.

When the idle time in which a signal pattern including a splitter signal has exceeded the threshold (as determined in 545) or if there are no further splitter outputs of a selected splitter (as determined in 530), the controller device 120 continues to 550. In 550, the controller device 120 determines whether all splitter branches of N have been utilized in the commissioning process. In this scenario, both outputs A, B of the splitter 305 have been utilized. Thus, all splitter branches of N (where N=1 and only two branches exist) have been utilized.

In 555, the controller device 120 determines whether all the branches for the splitter level N timed out. In this scenario, all the branches for the splitter level N did not time out as each output in the splitter 305 had a light string connected thereto. Thus, the controller device 120 continues to 560. In 560, the controller device 120 sets the next splitter level (e.g., N=N+1 [or N=2]). Thereafter, the controller device 120 returns to 530.

Through repeating 510-560, each light node in the lighting array 300 may be commissioned despite splitters being used to connect the light strings 325-355. Eventually, after all the light nodes have been commissioned, all branches time out as there are no further connections. The controller device 120 may assume that any time out from a previous splitter level extends to the next splitter level for purposes of 555. Thus, when the splitter signal has timed out for all branches of the tree structure associated with the lighting array 300, the controller device 120 continues the method 500 from 555 to 560 where the results of the commissioning process are generated. The results may be used to generate an overall map of the light nodes.

The exemplary embodiments provide a device, system, and method of determining addresses of light nodes in a lighting arrangement by commissioning the light nodes in an automated, dynamic mechanism. With only one light node being commissioned at a time, the addresses of each light node may be determined individually and relative to one another. Using an address signal that is asserted on an address line of a bus configuration, a light node may transmit system specific data on a bus of the bus configuration as a response that is used in determine the addresses. A subsequent light node may then receive the address line for commissioning. A splitter signal may also be used to address scenarios where the lighting arrangement includes one or more splitters. The splitter signal may be used with predetermined parameters such that the address signal is transmitted in an organized but dynamic manner for the commissioning process to be completed.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

The invention claimed is:

1. A system for determining addresses of nodes, comprising:
an arrangement including:
a first string including first nodes of the nodes;
a splitter including a plurality of splitter outputs; and
a second string connected to a first one of the splitter outputs, the second string including second nodes of the nodes;
a controller device connected to a first end of the first string, a second end of the first string connected to the splitter; and
a bus configuration configured to connect the nodes to one another and to the controller device, the bus configuration including:
a first line for transmitting signals in a first direction; and
a second line transmitting signals in a second direction,
wherein the controller device is configured to transmit a first signal on the first line that is received by the first nodes,
wherein the controller device is configured to sequentially receive first responses to the first signal on the second line from the first nodes each within a predetermined time period,
wherein each of the first nodes utilizes a first node output to transmit the first signal on the first line after transmitting the respective first response,
wherein the controller device is configured to assign first addresses to the first nodes based on the sequential receiving of the first responses,
wherein the controller device is configured to determine a time out of the first signal when no further response is received within the predetermined time period from the first string,
wherein the controller device is configured to generate a second signal that defines a path to a selected one of the splitter outputs,
wherein the controller device is configured to transmit the second signal on the first line to be received by the splitter,
wherein, when the selected splitter output is the first splitter output, the controller device is configured to sequentially receive second responses to the first signal on the second line from the second nodes each within the predetermined time period, and
wherein the controller device is configured to assign second addresses to the second nodes based on the sequential receiving of the second responses.

2. The system of claim 1, wherein the controller device is configured to generate a plurality of second signals, a number of the second signals corresponding to a number of the splitter outputs.

3. The system of claim 1, wherein the first and second responses are generated and transmitted by the first and second nodes, respectively, when each of the first and second nodes receives the first signal for a time duration, the time duration being less than the predetermined time period.

4. A method for determining addresses of nodes in an arrangement, the arrangement including a first string including first nodes of the nodes, a first end of the first string connected to the controller device, a splitter connected to a second end of the first string including a plurality of splitter outputs, and a second string connected to a first one of the splitter outputs, the second string including second nodes of the nodes, the method comprising the steps of:
connecting the nodes to one another and to the controller device via a bus configuration, the connecting step including,
connecting an output to a first line for transmitting signals in a first direction on the bus configuration; and connecting an input to a second line for receiving signals in a second direction on the bus configuration;

transmitting a first signal on the first line that is received by the first nodes, sequentially receiving first responses to the first signal on the second line from the first nodes each within a predetermined time period, each of the first nodes utilizing a first node output to transmit the first signal on the first line after transmitting the respective first response, assigning first addresses to the first nodes based on the sequential receiving of the first responses, determining a time out of the first signal when no further response is received within the predetermined time period from the first string, generating a second signal that defines a path to a selected one of the splitter outputs, transmitting the second signal on the first line to be received by the splitter, when the selected splitter output is the first splitter output, sequentially receiving second responses to the first signal on the second line from the second nodes each within the predetermined time period, and assigning second addresses to the second nodes based on the sequential receiving of the second responses.

5. The method of claim 4, wherein the first signal is asserted on the first line continuously, and wherein the second signal is asserted on the first line with a signal pattern.

6. The method of claim 4, wherein the controller device generates a plurality of second signals, a number of the second signals corresponding to a number of the splitter outputs.

7. The method of claim 4, wherein the plurality of splitter outputs is two outputs.

8. The method of claim 7, further including the step of determining a second time out of the first signal when no further response is received within the predetermined time period from the second string.

9. The method of claim 7, further including the step of determining a third time out of the first signal when no further response is received within the predetermined time period from a second splitter output of the splitter outputs.

10. The method of claim 8, wherein the arrangement includes a plurality of branches, and assigning addresses of each of the first and second nodes in the plurality of branches when the first or second time out is determined.

11. The method of claim 10, further including the step of determining an overall map of the arrangement based on received responses from the nodes.

12. A lighting array including the system for determining addresses of nodes according to claim 1.

13. The lighting array of claim 12, wherein the second signal includes at least one segment, and wherein the at least one segment corresponds to a splitter level, and wherein the splitter level corresponds to a number of splitters from the controller device (120).

14. The lighting array of claim 13, wherein the splitter level of the splitter is a first splitter level, the second signal including one segment.

15. The lighting array of claim 14, further comprising:
a further splitter including a plurality of further splitter outputs; and
a third string connected to a first one of the further splitter outputs, the third string including third nodes of the nodes.

* * * * *